United States Patent
Liu et al.

(10) Patent No.: US 10,924,228 B2
(45) Date of Patent: *Feb. 16, 2021

(54) COMMUNICATIONS WITH CARRIER SELECTION, SWITCHING AND MEASUREMENTS

(71) Applicant: Futurewei Technologies, Inc., Plano, TX (US)

(72) Inventors: Jialing Liu, Palatine, IL (US); Brian Classon, Palatine, IL (US); Xiang Chen, Campbell, CA (US); Vipul Desai, Palatine, IL (US); Qian Cheng, Aurora, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,114

(22) Filed: Aug. 20, 2019

(65) Prior Publication Data

US 2019/0372726 A1 Dec. 5, 2019

Related U.S. Application Data

(63) Continuation of application No. 15/090,955, filed on Apr. 5, 2016, now Pat. No. 10,411,847.

(Continued)

(51) Int. Cl.
*H04L 5/00* (2006.01)
*H04W 28/18* (2009.01)

(52) U.S. Cl.
CPC ............ *H04L 5/001* (2013.01); *H04L 5/0098* (2013.01); *H04W 28/18* (2013.01)

(58) Field of Classification Search
CPC ....................................................... H04L 5/001
(Continued)

(56) References Cited

U.S. PATENT DOCUMENTS 10,411,847 B2 * 9/2019 Liu .................... H04L 5/001
2010/0267394 A1 10/2010 Wu
(Continued)

FOREIGN PATENT DOCUMENTS

CN  101925130 A  12/2010
CN  101932070 A  12/2010
(Continued)

OTHER PUBLICATIONS

R1-150413 "Other considerations for carrier aggregation enhancement beyond 5 carriers", 3GPP TSG RAN WG1 Meeting #80, Athens, Greece, Feb. 9-13, 2015, 3 pages.
(Continued)

*Primary Examiner* — Peter G Solinsky
(74) *Attorney, Agent, or Firm* — Vierra Magen Marcus LLP

(57) ABSTRACT

The disclosure relates to a base station configuring component carriers to user equipment (UE). The base station determines one or more component carriers to configure based on the UE carrier aggregation capability and sends a first configuration signaling to configure the UE with the component carriers in one or more component carrier sets. The base station configures each of the component carrier sets with a first common parameters and operations set and sends a second configuration signaling to configure the component carrier sets of the UE with the first common parameters and operations set. The base station then sends a third configuration signaling to configure each of the component carriers in the UE with a second parameters and operations set.

21 Claims, 11 Drawing Sheets

Related U.S. Application Data

(60) Provisional application No. 62/146,149, filed on Apr. 10, 2015, provisional application No. 62/205,565, filed on Aug. 14, 2015.

(58) Field of Classification Search
USPC .......................................................... 370/329
See application file for complete search history.

(56) References Cited

U.S. PATENT DOCUMENTS

| | | |
|---|---|---|
| 2010/0322175 A1 | 12/2010 | Chen |
| 2011/0021154 A1 | 1/2011 | Marinier et al. |
| 2011/0267978 A1 | 11/2011 | Etemad |
| 2012/0002635 A1 | 1/2012 | Chung et al. |
| 2012/0004010 A1 | 1/2012 | Tamura et al. |
| 2012/0155272 A1 | 6/2012 | Quan et al. |
| 2012/0157143 A1 | 6/2012 | Tsunekawa et al. |
| 2012/0182958 A1 | 7/2012 | Pelletier et al. |
| 2012/0295610 A1 | 11/2012 | Deng et al. |
| 2013/0028192 A1 | 1/2013 | Cheng et al. |
| 2014/0092761 A1 | 4/2014 | Behravan et al. |
| 2014/0126547 A1 | 5/2014 | Tamura et al. |
| 2015/0071160 A1 | 3/2015 | Zeng et al. |
| 2015/0222345 A1 | 8/2015 | Chapman et al. |
| 2016/0081039 A1 | 3/2016 | Lindoff et al. |
| 2016/0183263 A1 | 6/2016 | Liu et al. |
| 2016/0242186 A1 | 8/2016 | Nissila |
| 2016/0262100 A1 | 9/2016 | Larsson et al. |
| 2016/0269919 A1 | 9/2016 | Kazmi et al. |
| 2017/0188335 A1 | 6/2017 | Uchino et al. |
| 2017/0195099 A1 | 7/2017 | Kahtava et al. |
| 2018/0310299 A1 | 10/2018 | Cheng et al. |

FOREIGN PATENT DOCUMENTS

| | | |
|---|---|---|
| CN | 101932104 A | 12/2010 |
| CN | 102356667 A | 2/2012 |
| CN | 102474758 A | 5/2012 |
| CN | 102740464 A | 10/2012 |
| WO | 2015026316 A1 | 2/2015 |

OTHER PUBLICATIONS

R1-151122 "Design of fast carrier selection for LAA", 3GPP TSG RAN WG1 Ad-hoc Meeting, Paris, France, Mar. 24-26, 2015, 5 pages.

R4-147913 "Requirements for increased carrier monitoring for idle mode 36.133", 3GPP TSG-RAN WG4 Meeting #73, San Francisco, USA, Nov. 17-21, 2014, 8 pages RP-141422 "Discussion on LTE evolution for wider spectrum sub-6 GHz", 3GPP TSG RAN Meeting #65, Edinburgh, UK, Sep. 9-12, 2014, 2 pages.

RP-142286 "New WI proposal: LTE Carrier Aggregation Enhancement Beyond 5 Carriers", 3GPP TSG RAN Meeting #66, Maui, Hawaii (US), Dec. 8-11, 2014, 9 pages.

International Search Report and Written Opinion dated Jul. 1, 2016 in International Patent Application No. PCT/CN2016/078677, 11 pages.

R1-094642 "Carrier aggregation configurations and DL/UL linkage", 3GPP TSG RAN WG1 Meeting #59, Jeju, Korea, Nov. 9-13, 2009, 4 pages.

R1-112597 "Discussion on different TDD UL-DL configurations on different bands in Carrier Aggregation" 3GPP TSG RAN WG1 Meeting #66, Athens, Greece, Aug. 22-26, 2011, 2 pages.

R3-090812 "Automatic selection of component carrier for carrier aggregation" 3GPP TSG RAN WG3 meeting # 63bis, Seoul, Korea, Mar. 23-26, 2009, 2 pages.

Office Action dated May 24, 2019, in Chinese Patent Application No. 201680021165.4, 10 pages.

Office Action dated Oct. 18, 2017, in U.S. Appl. No. 15/090,955, 30 pages.

Response to Office Action filed Jan. 17, 2018, in U.S. Appl. No. 15/090,955, 19 pages.

Office Action dated May 31, 2018, in U.S. Appl. No. 15/090,955, 20 pages.

Response to Office Action filed Aug. 30, 2018, in U.S. Appl. No. 15/090,955, 13 pages.

Office Action dated Oct. 31, 2018, in U.S. Appl. No. 15/090,955, 24 pages.

Response to Office Action filed Jan. 1, 2019, in U.S. Appl. No. 15/090,955, 17 pages.

Notice of Allowance dated Apr. 24, 2019, in U.S. Appl. No. 15/090,955, 7 pages.

* cited by examiner

COMMUNICATIONS WITH CARRIER SELECTION, SWITCHING AND MEASUREMENTS

CLAIM FOR PRIORITY

This application is a continuation application of U.S. patent application Ser. No. 15/090,955 filed on Apr. 5, 2016, which claims the benefit of priority to U.S. Provisional Application 62/146,149, filed Apr. 10, 2015, and U.S. Provisional Application 62/205,565, filed Aug. 14, 2015, the contents of which are hereby incorporated by reference.

BACKGROUND

In wireless communication networks, wireless traffic is increasing at an exponential rate. Not only is the number of user equipment (UE) increasing, but for some UEs, the amount of traffic (e.g., number of bits) per unit of time (e.g., per second) to be communicated is increasing. In particular, applications that demand higher amounts of traffic per unit of time, such as video, high-definition images, and the like, are seeing a significant increase in traffic.

Carrier aggregation (CA) is a technology that allows the UE, like a mobile telephone, to use one or more carriers in a wireless communication system, so as to possibly enhance the amount of traffic per unit of time for the UE. A carrier, or carrier wave or carrier signal, is a waveform that is modulated with an input signal for the purpose of conveying information. The carrier signal has an associated bandwidth that is used to convey the information according to the modulation scheme. When a UE uses more than one carrier, the UE can use the total bandwidth of the plurality of carriers. With a larger bandwidth, therefore, a UE may conduct a higher total amount of traffic communicated per unit of time, compared to a UE using a smaller bandwidth, with similar context such as status of channels.

CA enables multiple carrier signals to be simultaneously communicated between the UE and a supporting base station, typically, the UE may be configured with a set of carriers by a base station, such as an enhanced NodeB (eNB). In some instances, the carriers may be from different frequency bands to add greater bandwidth to support high data rate communications and operations, such as streaming video or large data files Another technology is to rely on carrier switching or selection (CS) to enable the UE to support more carriers than its own capability. Carrier switching/selection among all carriers available to the serving base station may allow the UE to access more carriers over time. In this approach, component carriers are selected based on several factors, such as load balancing. While the CS approach generally requires significantly less UE enhancement than the CA approach, one drawback to CS is the transition time involved in carrier switching and selection.

BRIEF SUMMARY

In one embodiment, the present technology relates to a method for a base station to configure component carriers to user equipment (UE), comprising the base station determining one or more component carriers to configure based on the UE carrier aggregation capability and sending a first configuration signaling to configure the UE with the one or more component carriers in one or more component carrier sets; the base station configuring each of the one or more component carrier sets with a first common parameters and operations set and sending a second configuration signaling to configure the one or more component carrier sets of the UE with the first common parameters and operations set; and the base station sending a third configuration signaling to configure each of the one or more component carriers in the UE with a second parameters and operations set.

In another embodiment, the present technology relates to a non-transitory computer-readable medium storing computer instructions for a base station to configure component carriers to user equipment (UE), that when executed by one or more processors, cause the one or more processors to perform the steps of determining one or more component carriers to configure based on the UE carrier aggregation capability and sending a first configuration signaling to configure the UE with the one or more component carriers in one or more component carrier sets; configuring each of the one or more component carrier sets with a first common parameters and operations set and sending a second configuration signaling to configure the one or more component carrier sets of the UE with the first common parameters and operations set; and sending a third configuration signaling to configure each of the one or more component carriers in the UE with a second parameters and operations set.

In still another embodiment, the present technology relates to a base station to configure component carriers to user equipment (UE), comprising a non-transitory memory storage comprising instructions; and one or more processors in communication with the memory, wherein the one or more processors execute the instructions to determine one or more component carriers to configure based on the UE carrier aggregation capability and send a first configuration signaling to configure the UE with the one or more component carriers in one or more component carrier sets; configure each of the one or more component carrier sets with a first common parameters and operations set and send a second configuration signaling to configure the one or more component carrier sets of the UE with the first common parameters and operations set; and send a third configuration signaling to configure each of the one or more component carriers in the UE with a second parameters and operations set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
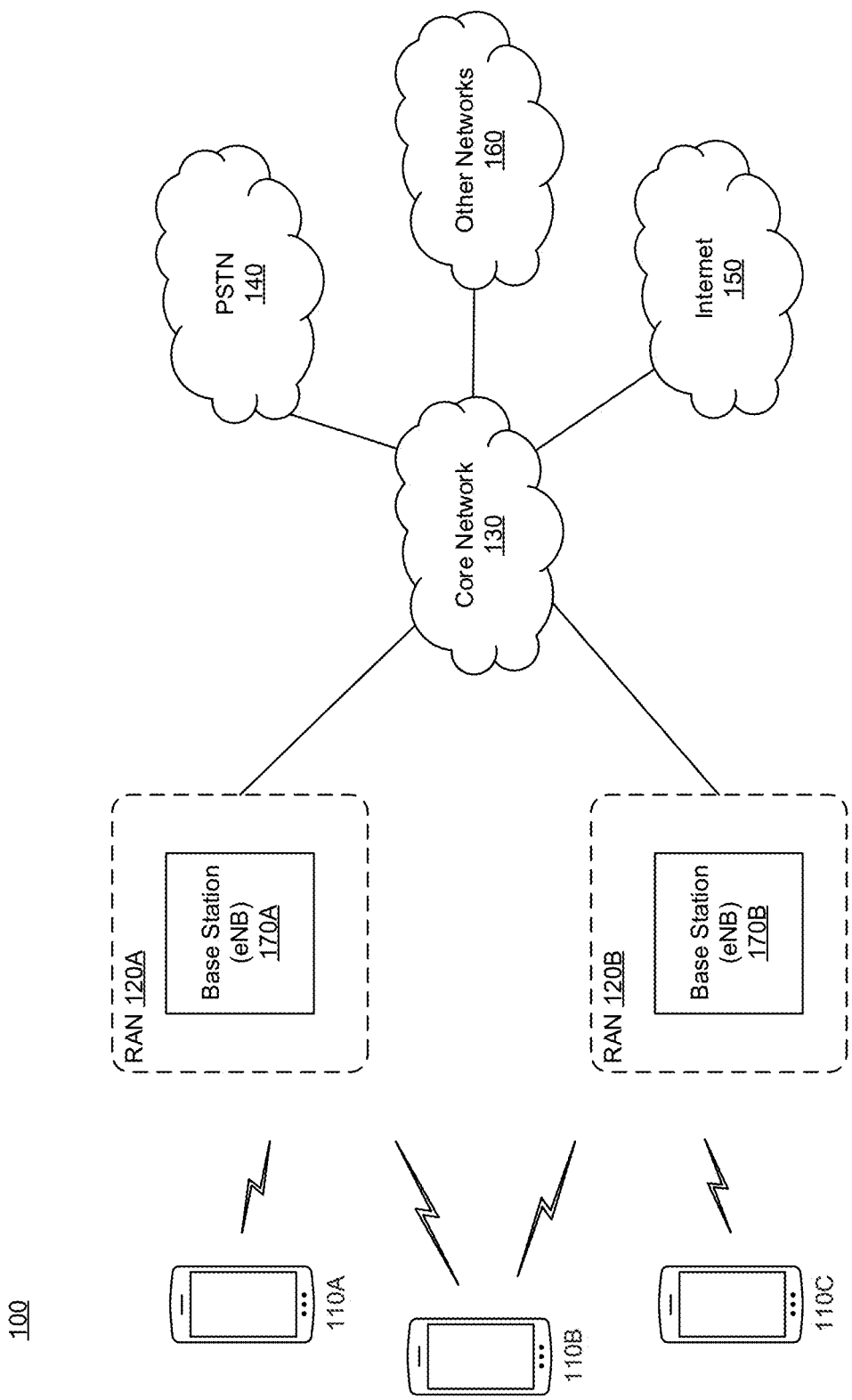
FIG. 1 illustrates a wireless network for communicating data.

The present technology, generally described, relates to a base station (or eNB) configuring component carriers to user equipment (UE). There are two primary approaches for a UE to better utilize available carriers: carrier selection and switching (CS). Using carrier selection, the base station performs selection of a subset of carriers available at the network. In carrier switching, the UE switches from one carrier to another carrier as instructed by the base station. That is, carrier switching specifies operations performed by the UE to support the base station carrier selection actions. CS can also be implemented semi-statically (i.e., semi-static CS, generally in the time scales of tens of milliseconds and longer) or dynamically (i.e., dynamic or fast CS, generally in the time scales of at most a few milliseconds). CS can also be applied to license assisted access (LAA) systems or general systems.

In particular, the technology relates to component carrier sets used to configure the component carriers of a component carrier set at the UE. A common set of parameters and operations (e.g., parameters and operations that are common to a component carrier set) may be used to configure each of the component carriers in the component carrier set. Configuring the UE in this manner enables a UE with otherwise limited capabilities to utilize a full spectrum supported by a serving base station.

In configuring the UE, the base station and UE first establish a connection. Once the connection is established, the UE may report its capabilities (e.g., carrier aggregation capabilities) to the base station. The base station then determines, based on the received UE capabilities, which component carriers to configure, and sends a first configuration signaling to configure the UE. The first configuration signaling identifies N secondary cells (Scells) in K component carrier sets for configuration, and the UE configures the component carriers in the component carrier sets with a set of common parameters and operations identified in the configuration signaling (e.g. in the same or different configuration signaling that identifies the N Scells in K component carrier sets).

The component carriers in the component sets may be updated as necessary by sending additional configuration signaling from the base station to the UE. This additional configuration signaling is determined based on reports sent from the UE to the base station that include updated information for a single component carrier in a component carrier set. The base station may derive updated information for each of the other component carriers in the set based on the updated information for the single component carrier and instruct the UE to update the entire component carrier set.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

FIG. 1 illustrates a wireless network for communicating data. The communication system 100 includes, for example, user equipment (UE) 110A-110C, radio access networks (RANs) 120A-120B, a core network 130, a public switched telephone network (PSTN) 140, the Internet 150, and other networks 160. While certain numbers of these components or elements are shown in the figure, any number of these components or elements may be included in the system 100.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The UEs 110A-110C are configured to operate and/or communicate in the system 100. For example, the UEs 110A-110C are configured to transmit and/or receive wireless signals or wired signals. Each UE 110A-110C represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include base stations 170A, 170B (collectively, base stations 170), respectively. Each of the base stations 170 is configured to wirelessly interface with one or more of the UEs 110A, 110B, 110C (collectively, UEs 110) to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the base stations 170 and UEs 110 are configured to implement the Long Term Evolution wireless communication standard (LTE), LTE Advanced (LTE-A), and/or LTE Broadcast (LTE-B). In other embodiments, the base stations 170 and UEs 110 are configured to implement UMTS, HSPA, or HSPA+ standards and protocols. Of course, other multiple access schemes and wireless protocols may be utilized.

The RANs 120A-120B are in communication with the core network 130 to provide the UEs 110 with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

In one embodiment, the base stations 170 comprise a carrier aggregation component (not shown) that is configured to provide service for a plurality of UEs 110 and, more specifically, to select and allocate carriers as aggregated carriers for a UE 110. More specifically, the carrier configuration component of base stations 170 may be configured to receive or determine a carrier aggregation capability of a selected UE 110. The carrier aggregation component operating at the base stations 170 are operable to configure a plurality of component carriers at the base stations 170 for the selected UE 110 based on the carrier aggregation capability of the selected UE 110. Based on the selected UE(s) capability or capabilities, the base stations 170 are configured to generate and broadcast a component carrier configuration message containing component carrier configuration information that is common to the UEs 110 that specifies aggregated carriers for at least one of uplink and downlink communications. In another embodiment, base stations 170 generate and transmit component carrier configuration information that is specific to the selected UE 110. Additionally, the carrier aggregation component may be configured to select or allocate component carriers for the selected UE 110 based on at least one of quality of service needs and bandwidth of the selected UE 110. Such quality of service needs and/or required bandwidth may be specified by the UE 110 or may be inferred by a data type or data source that is to be transmitted.

Although FIG. 1 illustrates one example of a communication system, various changes may be made to FIG. 1. For example, the communication system 100 could include any number of UEs, base stations, networks, or other components in any suitable configuration.

Figure 2A:
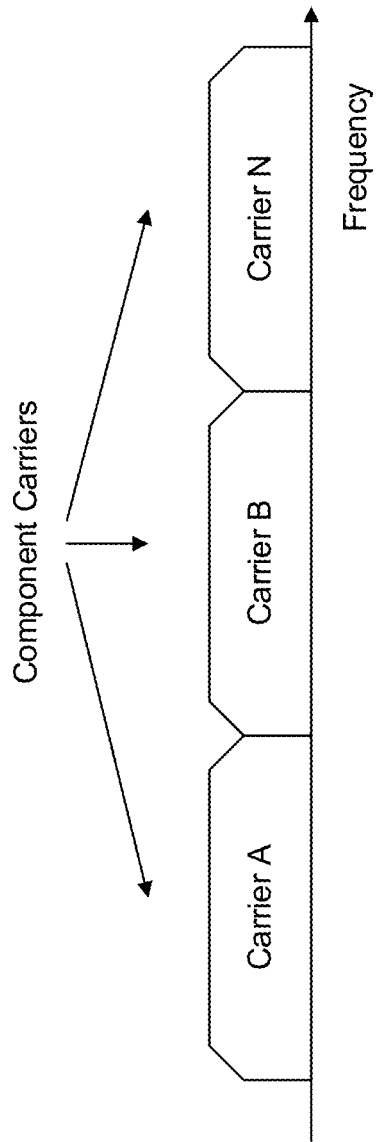
FIG. 2A illustrates an example of carrier aggregation of continuous carriers.

FIG. 2A illustrates an example of carrier aggregation of contiguous carriers. In the example, three carriers (carriers A, B and N) are contiguously located along a frequency band. Each carrier can be referred to as a component carrier.

In a contiguous type of system, the component carriers are located adjacent one another and are typically located within a single frequency band. A frequency band is a selected frequency range in the electromagnetic spectrum that are designated for use with wireless communications such as wireless telephony.

Figure 2B:
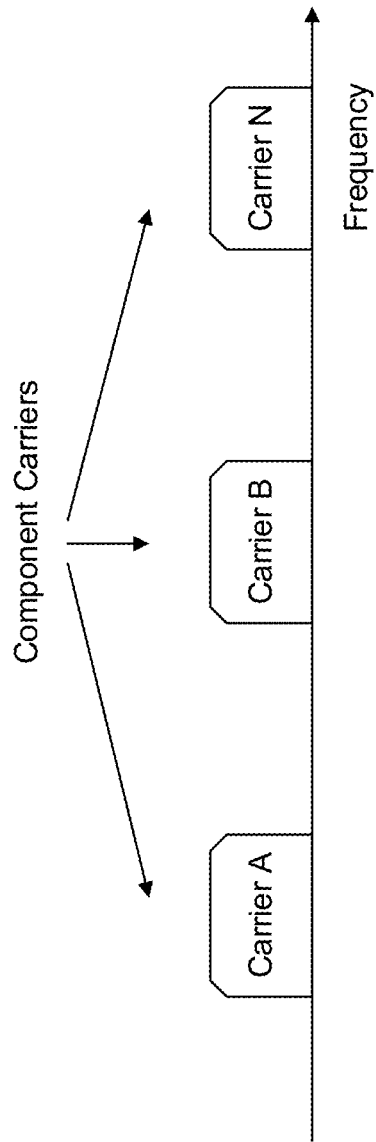
FIG. 2B illustrates an example of carrier aggregation of non-continuous component carriers.

FIG. 2B illustrates an example of carrier aggregation of non-contiguous component carriers. The non-contiguous component carriers (carriers A, B and N) may be separated along the frequency range, and each component carrier may be located within a same frequency band, or in different frequency bands. The ability to use component carriers in different frequency bands enables greater communication speeds and more efficient use of available bandwidth. It is appreciated that carriers may also be referred to as bands, frequency bands, etc., and that each aggregated carrier may be referred to as a component carrier (CC).

Additionally, carrier aggregation can make use of the carriers, which may be contiguously allocated within a same operating frequency band, or non-contiguously within a same operating frequency band or different operating frequency bands, possibly in a more efficient way. As channel statuses for a UE 110 on one or multiple carriers may vary due to factors such as the UE's mobility, time-varying conditions along the communication paths, it is of importance to configure a UE 110 with a set of carriers in a fast manner, to ensure the UE 110 to have a good set of carriers for its communication need, as well as the resources on the carriers are utilized efficiently.

When carrier aggregation is used there are a number of serving cells for a UE 110. For example, one cell can be for each component carrier for the UE 110. The coverage of the serving cells may differ, for example, due to that CCs on different frequency bands will experience different pathloss. The radio resource control (RRC) connection is handled by one cell, the Primary serving cell, served by the Primary component carrier (PCC). In idle mode, the UE 110 listens to system information on the downlink PCC. The other component carriers are all referred to as Secondary component carriers (SCC), serving the Secondary serving cells. The SCCs are added and removed as required, while the PCC is only changed at handover.

The carrier configuration for a UE 110 which uses carrier aggregation is UE 110 specific. The UEs 110 may have different PCCs and SCCs, even if these UEs 110 are close to each other or under a similar coverage by cells. A PCC for a first of the UEs 110 may be a SCC for a second of the UEs 110. The component carriers or the cells configured for a UE 100 for CA operation can be from a same site (a same eNB), or from more than one sites (more than one eNB). Throughout the disclosure, unless specifically mentioned otherwise, a component carrier and a carrier can be interchangeable.

Figure 2C:
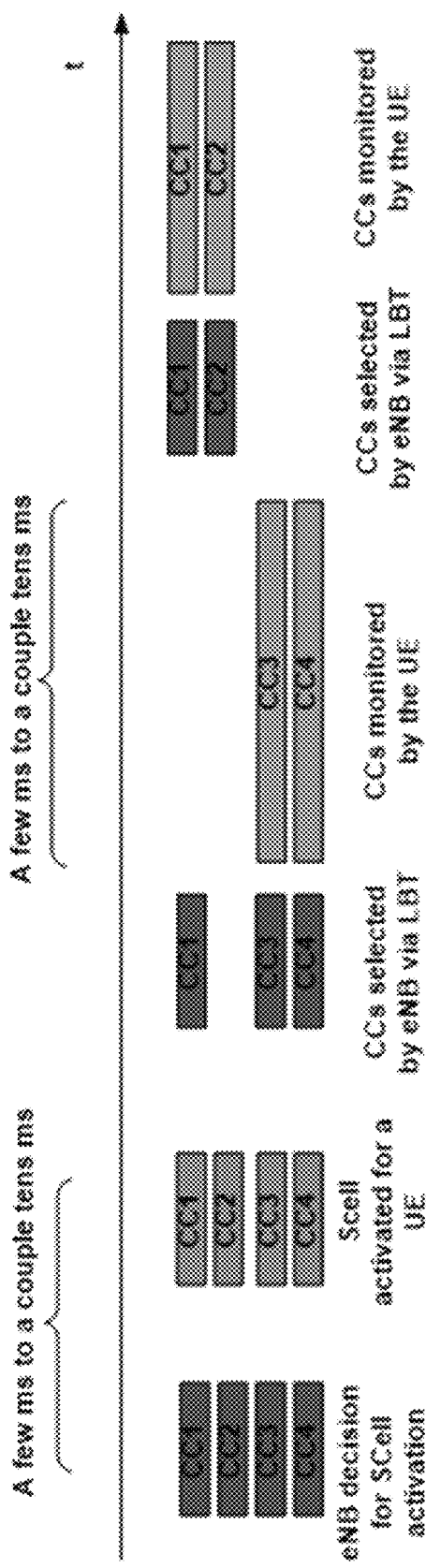
FIG. 2C illustrates an example of semi-static carrier selection/switching.

FIG. 2C illustrates an example of semi-static carrier selection/switching (CS). In this example, the base station 170 selects a subset of carriers based on, for example, interference and/or traffic load, and the UE 110 performs (semi-static) carrier switching as instructed by the base station 170 via, for example, SCell activation/deactivation. On the activated carriers, the UE 110 may monitor the control channels and may receive physical downlink shared channel (PDSCH). The base station 170 may select a different subset of carriers later and alter the activation/deactivation status of the SCells for the UE 110 accordingly.

Figure 2D:
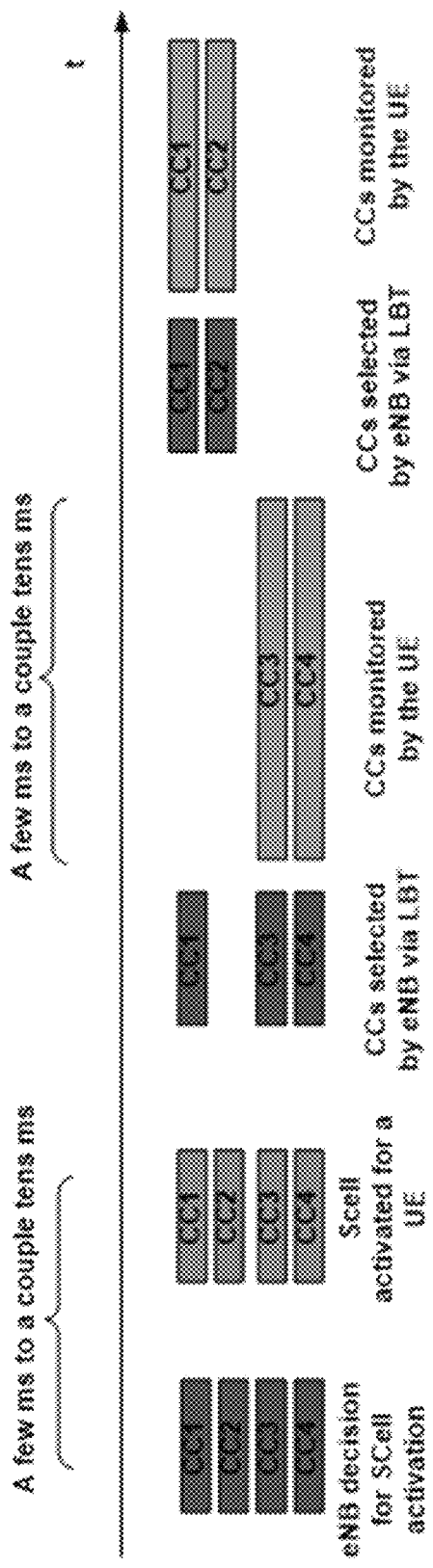
FIG. 2D illustrates an example of fast carrier selection/switching for license assisted access.

FIG. 2D illustrates an example of fast CS for LAA. In this example, on the carriers activated for a UE 110, the base station 170 performs the LBT procedure, and after the ICCA and/or ECCA, the base station 170 determines a subset of carriers on which it can transmit. Then the UE 110 performs (fast) carrier switching as instructed by the base station via a specified procedure (e.g., a L1 procedure), and the UE 110 monitors the control channels and may receive PDSCH. The eNB may select a different subset of carriers later for a different transmission burst and alter the monitoring status of the SCells for the UE 110 accordingly.

The CS-based approach may be implemented based on existing standards by performing the following procedure: (1) the network configures the UE 110 for inter-frequency neighbor cell measurements; (2) the UE 110 performs measurements during measurement gaps and reports to the network accordingly; and (3) the network configures an inter-frequency neighbor cell as an SCell, sending the UE 110 a configuration signaling including information such as cross-carrier scheduling information, transmission modes, etc., for the SCell.

However, the standard procedure may involve long delays. Nevertheless, CS may be used to improve throughput and coexistence performance. For example, CS may enable carrier-level and site-level interference avoidance and coordination, and allow load balancing/shifting across carriers and the base station 170. These improvements also apply to LAA systems and more general systems as well.

Additionally, multi-carrier listen before talk (LBT)-based discontinuous transmissions in LAA base station 170, in some instances, may determine the carrier availability only microseconds before it starts the transmissions on the carriers. However, given that transmission times may only last a few milliseconds to at most a couple tens of milliseconds, the base station 170 and the UE 110 should select/switch their carriers sufficiently fast.

Other benefits may include, for example, power saving for a UE 110, reducing the UE 110 monitoring activities, etc. That is, instead of requiring the UE 110 to monitor many carriers all the time, the UE 110 needs to monitor only a subset of the carriers per base station 170.

While FIGS. 2C and 2D illustrate some options for CS, additional embodiments may also be included. In a first embodiment, semi-static carrier switching uses a legacy mechanism. In particular, the following procedures may be performed in this embodiment: the base station 170 identifies and selects suitable carriers (~100s ms). Subsequently, one or more carriers within the selected carriers are configured to the UE 110 (~100s ms) which will not exceed the maximum number of carriers over which UE 110 can aggregate PDSCH. Furthermore, one or more carriers within the configured carrier are activated to the UE 110 (~10s ms) such that the UE 110 can be scheduled on the activated carriers dynamically based on the LBT mechanism.

In a second embodiment, the base station 170 can configure the UE 110 with additional CCs, which CCs can potentially exceed the maximum number of carriers over which the UE 110 can aggregate PDSCH. Then, the base station 170 can activate one or more carriers among the configured carriers to the UE 110 using existing signaling, e.g., MAC signaling. Subsequently, that UE 110 can be scheduled on the activated carriers dynamically based on the LBT mechanism.

As appreciated, the primary distinction between the first and second embodiments focuses on the different number of configured carriers. In particular, since the second embodiment supports more carriers configured to UE 110, the long delay associated with configuration signaling is removed. Furthermore, updated RRM measurements for these carriers are typically available, thereby reducing the delay associated with the measurement process. That is, carrier switching to a configured SCell is more efficient than carrier switching to an inter-frequency neighbor cell.

In a third embodiment, the UE 110 can switch to receive on any carriers within a set of component carriers selected by the serving base station 170 as fast as the subframe/symbol-level, while the number of carriers within the set may exceed the maximum number of carriers over which the UE 110 can aggregate PDSCH.

In one example of semi-static carrier switching using legacy mechanisms, consider the case where base station 170 supports 8 carriers and the UE 110 supports up to 5 carriers for simultaneous PDSCH reception. The UE 110, during operation, switches from an initial set of 5 carriers to another set of 5 carriers. Procedurally, this is implemented as follows: (1) the UE 110 is configured with an initial set of 5 CCs; (2) the network configures the UE 110 for inter-frequency neighbor cell measurements for the other 3 carriers; (3) the UE 110 performs measurements (e.g., during measurement gaps) of the 3 carriers and reports the measurements to the network; (4) the network reconfigures the SCells for the UE 110 with a RRC signaling, which indicates 3 current SCells are removed and the 3 inter-frequency neighbor cells are added as SCells. Additional configuration information may also be transmitted, such as cross-carrier scheduling information, transmission modes, etc., for the new set of 5 CCs. The newly added 3 SCells are initially deactivated; (5) the network activates the newly added SCells for data transmissions, with MAC signaling; and (6) steps (2)-(5) are repeated if switching to a different set of 5 carriers is required.

In an example of semi-static carrier switching with enhanced SCell configuration, the procedure is as follows: (1) the UE 110 is configured with an initial set of 5 CCs; (2) the network reconfigures the SCells for the UE 110 with a RRC signaling, which indicates the 3 inter-frequency neighbor cells are added as SCells. Additional configuration information may also be transmitted, such as cross-carrier scheduling information, transmission modes, etc., for the 8 carriers. The newly added 3 SCells are initially deactivated. The measurements for the 3 carriers may be, for example, based on one of the prior measurements as indicated in the example above; (3) the network activates the newly added SCells for data transmissions and deactivates 3 other SCells, with MAC signaling; and (4) step (3) is repeated if switching to a different set of 5 carriers is required.

In still one other example, we consider fast carrier switching which may be based on, for instance, an L1 procedure/signaling (which may be based on LBT in the case of LAA) within the set of at most 5 activated CCs. That is, fast carrier switching is performed among at most 5 CCs. In another example, more than 5 CCs can be activated at the same time, but the L1 signaling is used to indicate to the UE up to 5 CCs for PDCCH monitoring. That is, fast carrier switching is performed by more than 5 CCs, if the Scell configuration enhancement is used. Alternatively, this may be performed using enhanced activation/deactivation signaling. In this case, fast carrier switching is performed by more than 5 CCs, if the Scell configuration enhancement is used.

According to the above-described embodiments, SCell configuration enhancements allow both semi-static and fast carrier switching with reduced transition time since the delay associated with the SCell configuration signaling, as well as the delay associated with the measurement process, are decreased. However, configuring more carriers to a UE 110 does not necessarily require that the UE 110 has to be able to receive PDSCH from all of the configured carriers at the same time. Rather, CS can allow the UE 110 to efficiently use all of the configured and/or activated carriers over a period of time.

Figure 3:
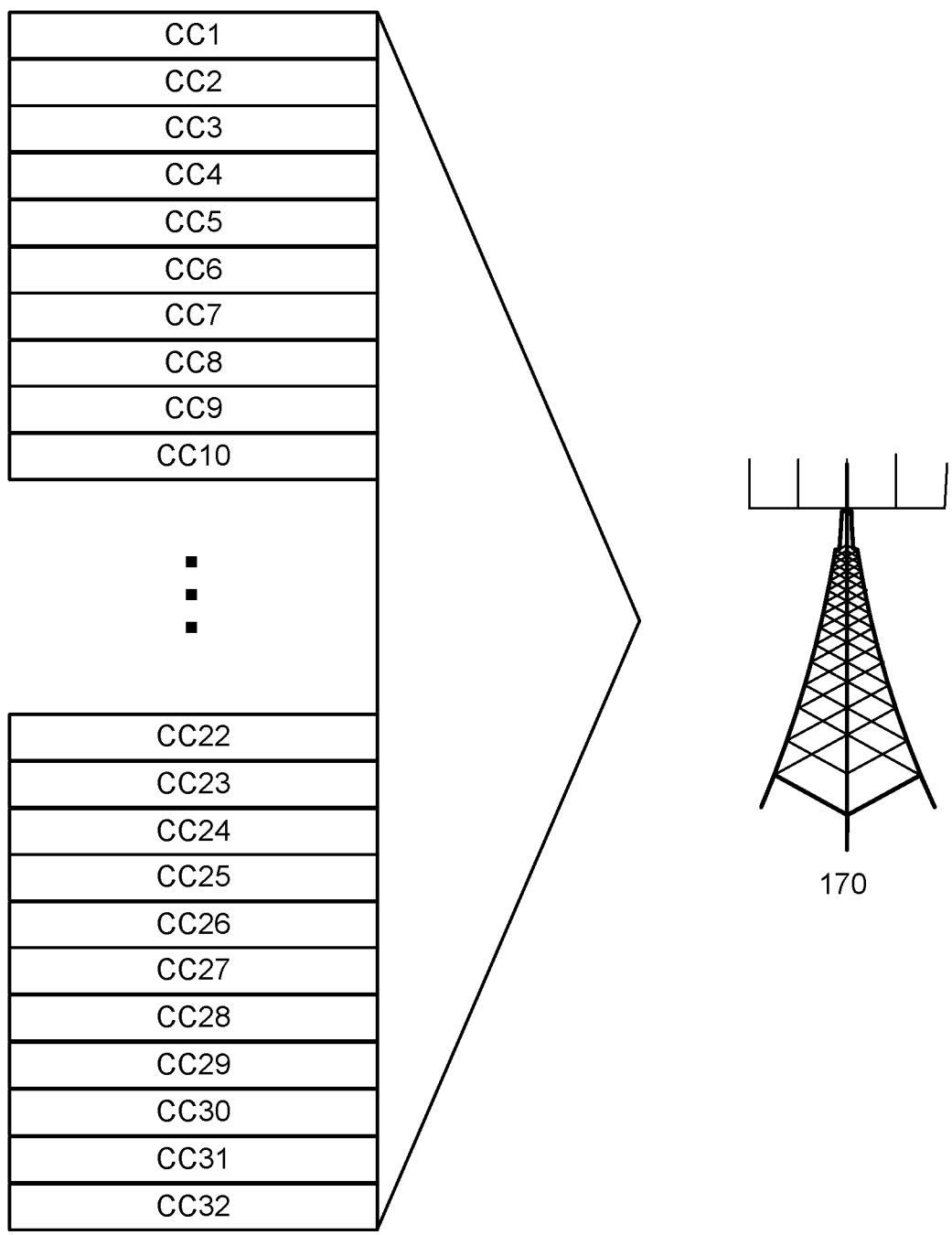
FIG. 3 illustrates an example of user equipment configured with multiple component carriers.

FIG. 3 illustrates an example of user equipment configured with multiple component carriers. With new applications requiring higher throughputs, increasing the number of aggregated carriers at a UE 110 can meet the throughput requirements. In general, this would require higher UE 110 capability in terms of the number of RF chains and baseband processing power. However, with large chunks of contiguous spectrum becoming available within one band, the number of RF chains may be maintained at a reasonable level to support a larger number of carriers within a limited number of bands.

Moreover, baseband processing power is expected to continuously improve to allow the UE 110 to support more carriers. That is, the carrier aggregation framework will be extended to handle up to 32 carriers in both the uplink and downlink. This means that, in principle, LTE UEs will be able to handle bandwidths up to 640 MHz, part of which can be located in unlicensed spectrum. Such carrier aggregation of a massive number of carriers may be called Massive CA (MCA). Nevertheless, the UE 110 capability of aggregating the spectrum resources for communications on all the resources at the same time is limited. That is, although the base stations 170 may have the capability to support 32 carriers (CC1 to CC32), a UE 110 often supports less than all of the available carriers.

For example, carrier selection can allow a UE 110 to be scheduled on any carrier available to the base station 170, even if the UE's CA capability is limited to a small number. Thus, as will explained in greater detail below, a UE 110 may only support aggregation of up to an amount less than the base station 170, for example up to 5 CCs. However, in an unlicensed band at 5.8 GHz, 14 orthogonal 20 MHz channels (i.e., carriers) may be supported by the base station 170, which is beyond the UEs capability of 5 CCs. Accordingly, aspects of this disclosure allow the UE 110 to better utilize the large number of carriers available at the base station 170, without significantly increasing UE 110 capability requirements. This also helps the system 100 to perform efficient load balancing across all carriers.

Figure 4:
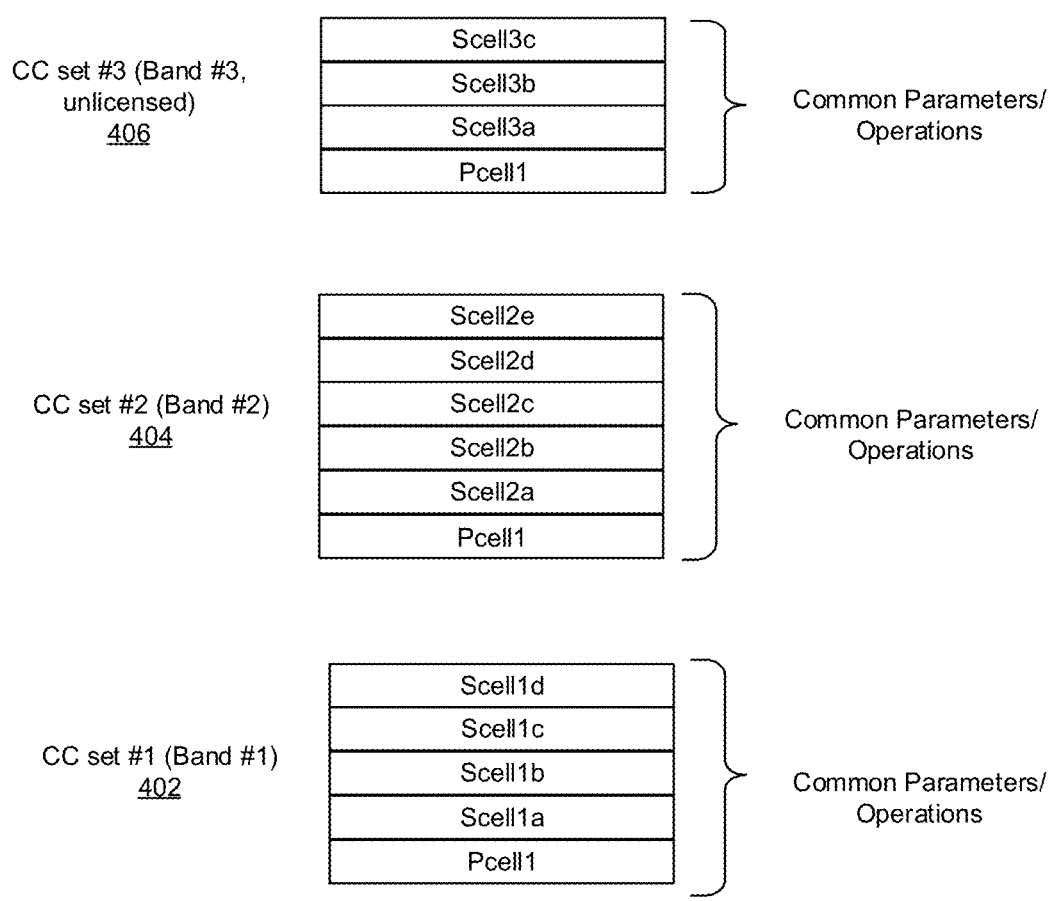
FIG. 4 illustrates an example of configuring component carrier sets to user equipment.

FIG. 4 illustrates an example of configuring component carrier sets to user equipment. The figure depicts three example embodiments in which a UE 110 may be configured using a set of component carriers (CCs) in different bands (e.g., band #1, band #2, band #3). In each of the bands, the number of carriers that can be configured is more that the UE's capability.

For example, assuming the UE 110 has a capability of 5 CCs, the set of component carriers (or CC set) may be used to configured the UE 110 with a capability of the base station 170, for example a total of 32 CCs (as depicted in FIG. 3). Thus, at different times, the base station 170 can select different sets of CCs (e.g., CC 402, CC set 404, CC set 406) for simultaneous reception or transmission (up to the UE capability). It is appreciated that the CC sets 402, 404 and 406 are non-limiting examples, and that any number of different CC sets may be formed depending on a variety of factors.

Using the above methodology, the network can determine which CC sets 402, 404, 406 to select without having to rely on RRC signaling. Configuring more carriers allows access to more carriers over time and better carrier utilization according to measurement results or a change of services.

In one embodiment, the carriers are configured according to three CC sets, namely CC set 402, CC set 404 and CC set 406. Each of the sets, as explained above, are tied to a different band (e.g., band #1, band #2, band #3) and may be licensed or unlicensed. The available carriers at the base station 170 correspond to the entire number of CCs available (for example, CCs 1-32 in FIG. 3), and are potentially usable by a UE 110, even when the UE capability of receiving or monitoring is less than the entire number of carriers. In the example of FIG. 4, there are a total of fifteen (15) CCs in the three CC sets 402, 404, 406, where each set has been configured according to a UE 110 CA capability. The base station 170, on the other hand, may support all fifteen CCs.

In the CC sets 402, 404, 406, the primary cell (Pcell1) is first configured by RRC signaling to establish a connection with the base station 170. While the figure represents a single UE 110, it is appreciated that each UE 110 may be configured with a respective Pcell, such that multiple cells service serve as a Pcell for multiple UEs 110. After receipt of the carrier aggregation (CA) capability report (e.g. physical downlink shared channel (PDSCH) report including CA capability form carriers) from the UE 110, the base station 170 determines, for example based on traffic load balancing/shifting, interference coordination and avoidance or UE 110 power savings, the number of CCs to configure (in the illustrated example, the CC sets include 5 CCs, 6 CCs and 4 CCs) for each CC set (CC sets 402, 404, 406), respectively, and sends a configuration signaling to configure the UE 110 with N secondary cells (in the example of CC set 402, 4 secondary cells Scell1a . . . 1d) in K CC sets (in this example, 3 CC sets 402, 404, 406), where N+1 may be greater than m.

Each CC set 402, 404, 406 may then be configured with a CC-specific set of parameters and/or operations that are common to each of the CCs in the selected CC set 402, 404, 406. The common set of parameters and/or operations may include, but are not limited to, pathloss (PL), downlink-uplink (DL-UL) configuration, timing advanced group (TAG), power control, and quasi co-located (QCL) such as angle of arrival (AoA) and angle of departure (AoD), etc. For QCL, it is noted that two antenna ports are quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

Once each of the CC sets 402, 404, 406 are configured (or, depending on the configuration, less than the entirety of sets), the UE 110 monitors a respective one of the CCs in each of the CC sets 402, 404, 406 and takes measurements for the respective CC. For example, UE 110 may monitor and measure Scell1a in CC set 402, Scell2a in CC set 404 and Scell3a in CC set 406. The measurements for Scells 1a, 2a and 3a are reported, for example as a reference signal received power (RSRP) report, to the base station 170. The base station 170 can then determine the RSRP for each of the other CCs (Scell1b, 1c and 1d for CC set 402; Scell 2b, 2c, 2d and 2e for CC set 404; and Scell 3b and 3c for CC set 406) in the CC sets (CC set 402, CC set 404, CC set 406), respectively, based on the measurement report of the measured CC.

Figure 5A:
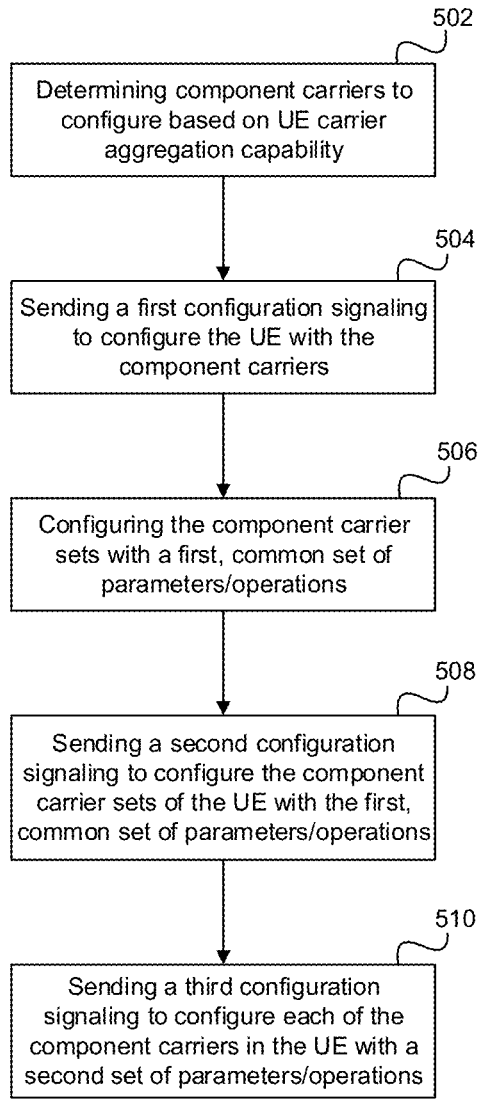
FIG. 5A illustrates the implementation of a base station in configuring component carriers of user equipment.
Figure 5B:
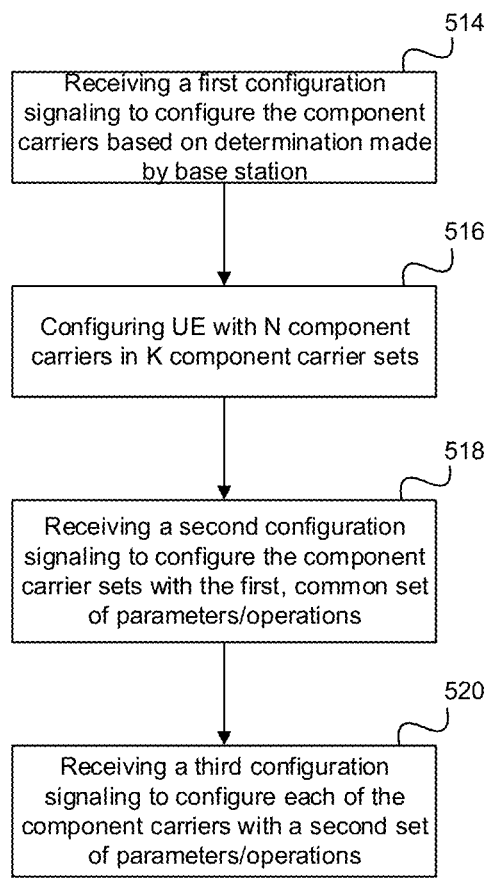
FIG. 5B illustrates the implementation of user equipment in configuring component carriers based on information received from a base station.

FIGS. 5A and 5B illustrate flow diagrams in accordance with embodiments of the disclosure. In particular, FIG. 5A illustrates the implementation of a base station 170 in configuring CCs of a UE 110. At 502, the base station 170, after establishing a connection with a UE 110 and receiving a CA report, determines which of the CCs to configure based on the UE CA capability report. At 504, the base station 170 sends a first configuration (e.g., the configuration determined in 502) signaling to configure the UE 110 with CCs in the CC sets 402, 404, 406. At this stage, the UE 110 may configure N CCs and K CC sets based on the configuration signaling sent by the base station 170.

At 506, the base station 170 then configures the CC sets 402, 404, 406 with a common set of parameters and/or operations, and sends a second configuration (e.g., the configuration determined in 506) signaling to configure the UE 110 with a common set of parameters and/or operations (for example, set specific parameters and/or operations) at 508. At this stage, the UE 110 may configure each of the CC sets 402, 404, 406 with the common set of parameters and/or operations received from the base station 170. As explained, these parameters and/operations include, but are not limited to, pathloss (PL), DL-UL configuration, timing advanced group (TAG), power control, and quasi co-located (QCL) such as AoA and AoD, etc.

At 510, after receiving updated carrier information from the UE 110, the base station 170 sends a third configuration signaling to configure each of the one or more CCs in the UE with a second set of parameters and/or operations. While the first set of parameters and/or operations are set-specific, the second set of parameters and/or operations are CC-specific configurations. Accordingly, after the UE 110 receives the third configuration, two sets of configurations exist for a CC set of CCs. For example, for CC1 (FIG. 4) in CC set 402, the second configuration signaling provides a set of parameters and/or operations that are common to all of the CCs in a CC set (e.g., the parameters and/or operations received for Scell1$a$ equally apply to Scell 1$b$, 1$c$ and 1$d$, whereas the third configuration signaling provides a CC-specific parameters and/operations that are different for each CC in a set (e.g., each Scell 1$a$-1$d$ has its own set of parameters and/or operations).

FIG. 5B illustrates the implementation of a UE 110 in configuring CCs based on information received from a base station 170. At 514, the UE 110, after establishing a connection with a base station 170 and sending a CA report to the base station 170, receives a first configuration (e.g., the configuration sent at 504) signaling the UE 110 to configure the CC sets 402, 404, 406 with CCs at 514.

At this stage, the UE 110 configures N CCs and K CC sets based on the first configuration signaling sent by the base station 170. Subsequently, at 518, the UE 110 receives a second configuration (e.g., the configuration determined in 506) signaling to that includes a common set of parameters and/or operations (for example, set specific parameters and/or operations). At this stage, the UE 110 may configure each of the CC sets 402, 404, 406 with the common set of parameters and/or operations received from the base station 170.

At 518, after sending updated carrier information to the base station 170, the UE 110 receives a third configuration from the base station 170 at 520 signaling to configure each of the one or more CCs with a second set of parameters and/or operations. Similar to the description above, the first set of parameters and/or operations are set-specific and the second set of parameters and/or operations are CC-specific configurations. Accordingly, after the UE 110 receives the third configuration, two sets of configurations exist for a CC set, as described above.

It is appreciated that while the configuration of the UE 110 by base station 170 of the CCs in the CC sets 402, 404, 406 and the configuration of the common set of parameters and/or operations is signaled to the UE 110 using separate configuration signaling, a single configuration signaling or multiple configuration signaling may be employed. That is, the configuration information may be sent to the UE 110 from the base station 170 using any number of configuration signaling.

Figure 6:
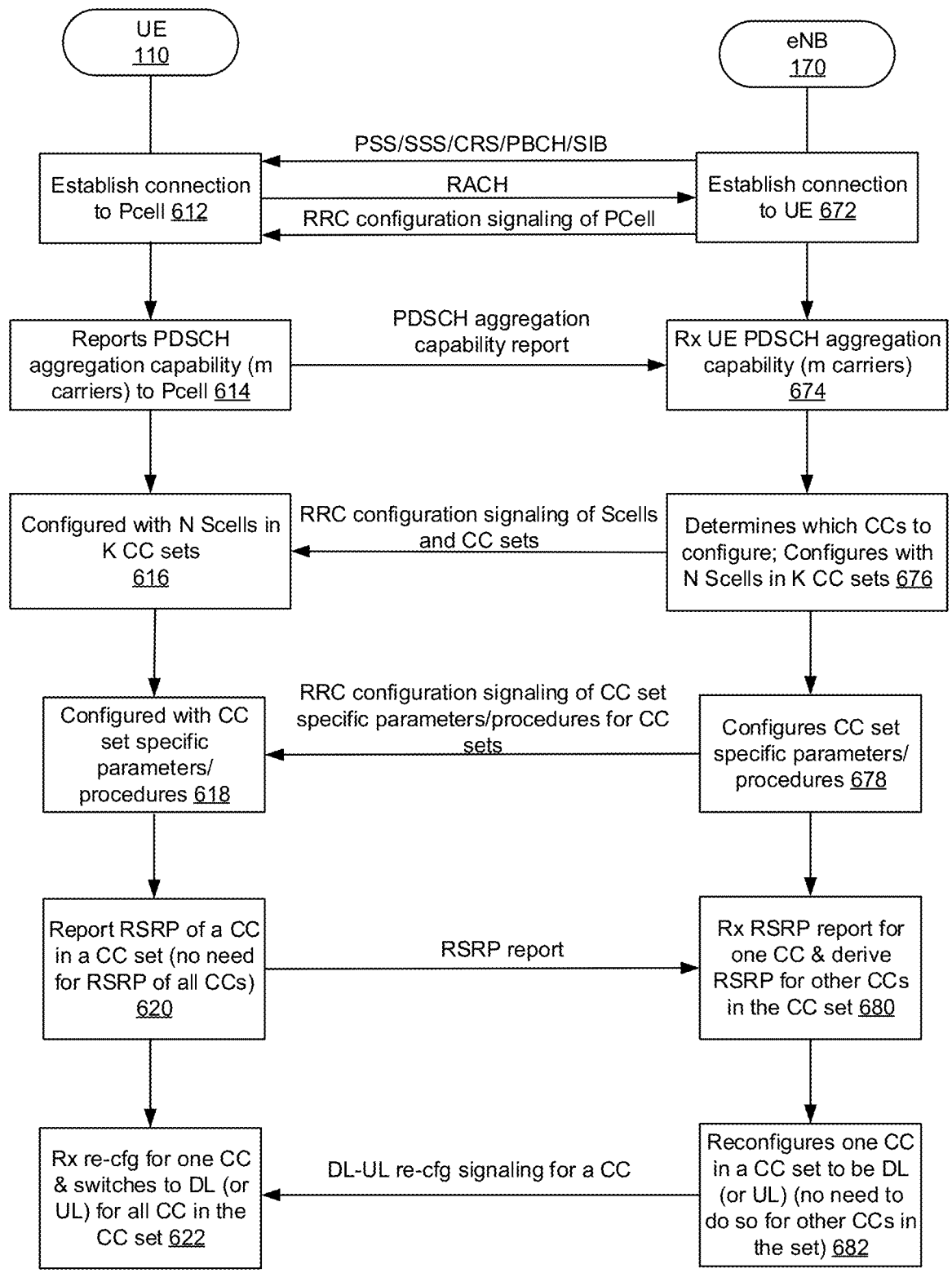
FIG. 6 illustrates a sequence diagram of configuring component carrier sets in accordance with FIGS. 3, 4, 5A and 5B.

FIG. 6 illustrates a sequence diagram of configuring component carrier sets in accordance with FIGS. 3, 4, 5A and 5B. More specifically, FIG. 6 illustrates one embodiment of configuring CC sets 402, 404, 406 and providing a measurement report(s) (e.g., RSRP report) for reconfiguration of the CCs in a CC set 402, 404, 406. In the example embodiment, a UE 110 is assumed to be capable of simultaneously receiving data on up to m carriers.

At 612 and 672, UE 110 and base station 170 establish a connection to each other. In establishing the connection, the UE 110 opens a random access channel (RACH) with the base station 170, which may then assign available carries to the UE 110. For example, base station 170 assigns a Pcell and Scells to the UE 110. All of the carriers available at the base station 170 are potentially usable by the UE 110, even if the UE capability of receiving or monitoring is less than the total number of carriers. The base station 170 may use configuration signaling, such as RRC configuration signaling, to configure the Pcell, such that UE 110 configures the Pcell upon receipt of the configuration signaling. In response, UE 110 reports a CA (e.g., PDSCH) aggregation capability to the base station 170 ay 614. In this example, the PDSCH aggregation capability is to support receiving PDSCH from m carriers simultaneously.

After receiving the PDSCH aggregation capability report at 674, the base station 170 determines which of the CCs need to be configured on the UE 110. Once the determination is made as to which CCs require configuration, for example considering traffic load and interference, the base station 170 may use configuration signaling (such as an RRC configuration) to configure carriers as serving cells of the UE 110 at 676. That is, the base station 170 configures a number of N Scells in K CC sets, where K is the number of CC sets 402, 404, 406. At this stage, N+1 Scells may be greater than the number of m carriers. Subsequently, the UE 110 is configured with the N Scells in K CC sets 402, 404, 406 at 616. For example, the UE 110 is configured with 3 CC sets (CC sets 402, 404, 406) each having N Scells (CCs 1$a$-1$d$, 2$a$-2$e$ and 3$a$-3$c$, depicted in FIG. 4).

Once the UE 110 is configured with the N Scells in K CC sets 402, 404, 406 at 616, the base station 170 configures the CC sets 402, 404, 406 to the UE 110 at 678. The configuration determined at the base station 170 is conveyed to the UE 110 by RRC configuration signaling of the CC set-specific parameters and/or operations for the CC sets 402, 404, 406. The CC set-specific (common set) parameters and/or operations for each of the CC sets 402, 404, 406 are the same as those described above. Using the CC set-specific parameters and/or operations (or common set of parameters and/or operations) enables configuration of CC sets 402, 404, 406, where each set is configured with the parameters and/or operations applicable to all CCs in the set. Thus, parameters and/or operations for a single CC of a CC set may be monitored and measured in order to configure each of the other CCs in a CC set 402, 404, 406 (without measuring or monitoring each of the other CCs).

The UE 110, after receiving the RRC configuration signaling, performs an associated radio configuration procedure at 618, such that the procedure configures the N Scells in the K CC sets with the CC set-specific parameters and/or operations. That is, each CC in a respective CC set 402, 404, 406 is configured with the same set of parameters and/or operations. For example, for CC set 402, Scells 1$b$-1$d$ are each configured with the same parameters and/or operations as sent by the base station 170 in the RRC configuration signaling of the CC set. However, the UE 110 may configure the entire set of a CC set with receipt of configuration signaling of a single CC in a CC set.

In the embodiment of FIG. 6, at 620, the UE 110 monitors and measures the RSRP of a CC in a CC set, for example Scell 1a in CC set 402. Notably, the UE 110 need not monitor and measure each of the CCs in the CC set 402 since the parameters and/or operations assigned to the CC set 402 are common to all CCs in the set. Rather, only a single CC in the CC set 402 requires measurement. After measuring and monitoring, the UE 110 sends an RSRP report to the base station 170 that includes the measurements of the single CC in the CC set 402. Although RSRP measurements and reports are generated in the example, it is appreciated that the system is not limited to these type of measurements and reports.

The base station 170, upon receipt of the measurement report from the UE 110, calculates RSRPs for each of the other CCs in the CC set 402 based on the RSRP report of the measured CC by the UE 110 at 680. Then, the base station 170 reconfigures one of the CCs in the CC set 402 to be a DL or UL at 682, and sends a DL-UL configuration signaling for the reconfigured CC in the CC set 402 to the UE 110. Notably, the base station 170 is only required to reconfigure one of the CCs in the CC set 402, as well send a DL-UL configuration signaling for the reconfigured CC. The UE 110 receives the DL-UL configuration signaling for the reconfigured CC and switches the to the UL/DL configuration for each of the other CCs in the CC set 402 to match the reconfigure CC received from the base station 170 at 622.

It is appreciated that while multiple RRC configuration signaling is implemented in the disclosed embodiment, a single (or any number) of RRC configuration signaling may be employed to configure carriers. Thus, the base station 170 may use multiple configuration signaling or single RRC configuration signaling to configure the carriers.

In an alternative embodiment of configuring the CC sets 402, 404, 406, the CCs and CC sets 402, 404, 406 may be designated using CC and CC set indicators. For example, the CC indicators may be cell IDs or physical cell IDs (PCIDs), where each cell has its own cell ID. When configuring a cell for a UE 110, the base station 170 specifies a cell ID. Similarly, the CC set indicators are cell set IDS, in which a first set may have the indicator "1", the second set may have the indicator "2" and the like.

A reference CC indicator, which is a cell ID of a reference cell, may also be employed. For example, the base station 170 configuration signaling to UE 110 may specify that cells 1, 2 and 3 use cell 0 as the reference cell. Accordingly, cells 0-3 are identifies as being in one CC set, and the set-common parameters/operations are based according to the configurations of cell 0.

Figure 7:
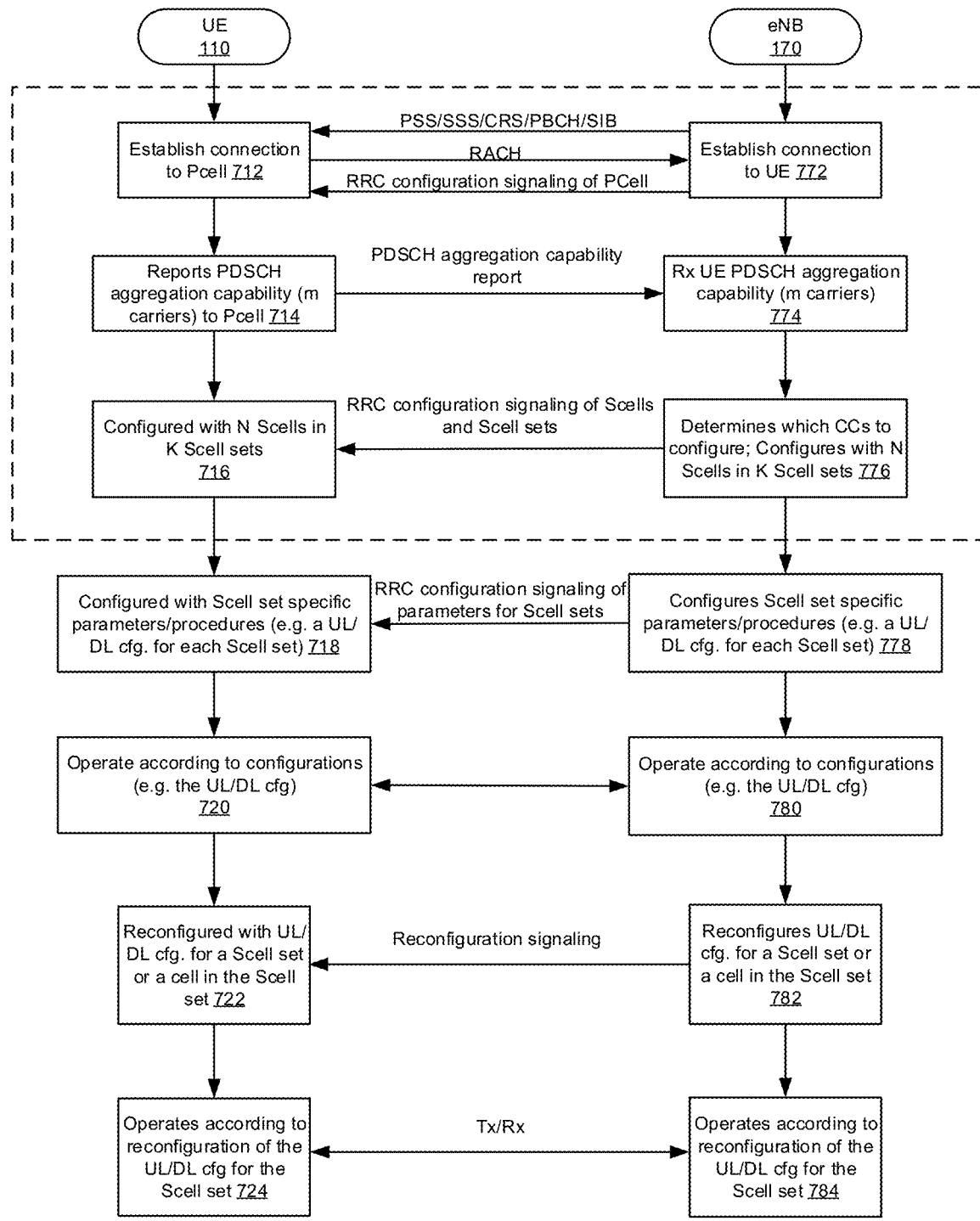
FIG. 7 illustrates another sequence diagram of configuring component carrier sets in accordance with FIGS. 3, 4, 5A and 5B.

FIG. 7 illustrates another sequence diagram of configuring component carrier sets in accordance with FIGS. 3, 4, 5A and 5B. More specifically, FIG. 7 illustrates another embodiment of configuring CC sets 402, 404, 406 similar to FIG. 6. In the example embodiment, the establishment of a connection at 712 and 772, reporting of CA capability at 714 and 774 and initial configuration of N Scells in K Scell sets at 716 and 776 between UE and 110 and base station 170 is the same as described in FIG. 6.

At 778, the base station 170 configures the CC (Scell) set specific parameters and/or operations (e.g., the common set of parameters and/or operations). For example, in this embodiment, the base station 170 sends an RRC configuration signaling of the parameters and/or operations for the CC sets 402, 404, 406 to configure the UL/DL configuration for each CC set 402, 404, 406. The UE 110 is then configured with the UL/DL configuration for each CC set 402, 404, 406 at 718. The UE 110 and base station 170 then operation according to the UL/DL configurations at 720 and 780.

At 782, the base station 792 reconfigures the UL/DL configuration for a CC set 402, 404, 406 or a CC in the CC set 402, 404, 406 based on a variety of factors, for example, changes in traffic load. The base station 170 sends a reconfiguration signaling to the UE 110 to reconfigure the CC set 402, 404, 406 or CC in the CC set 402, 404, 406 at 722. Subsequently, the UE 110 and base station 170 operate according to the reconfiguration of the UL/DL configuration for the CC set 402, 404, 406.

Figure 8:
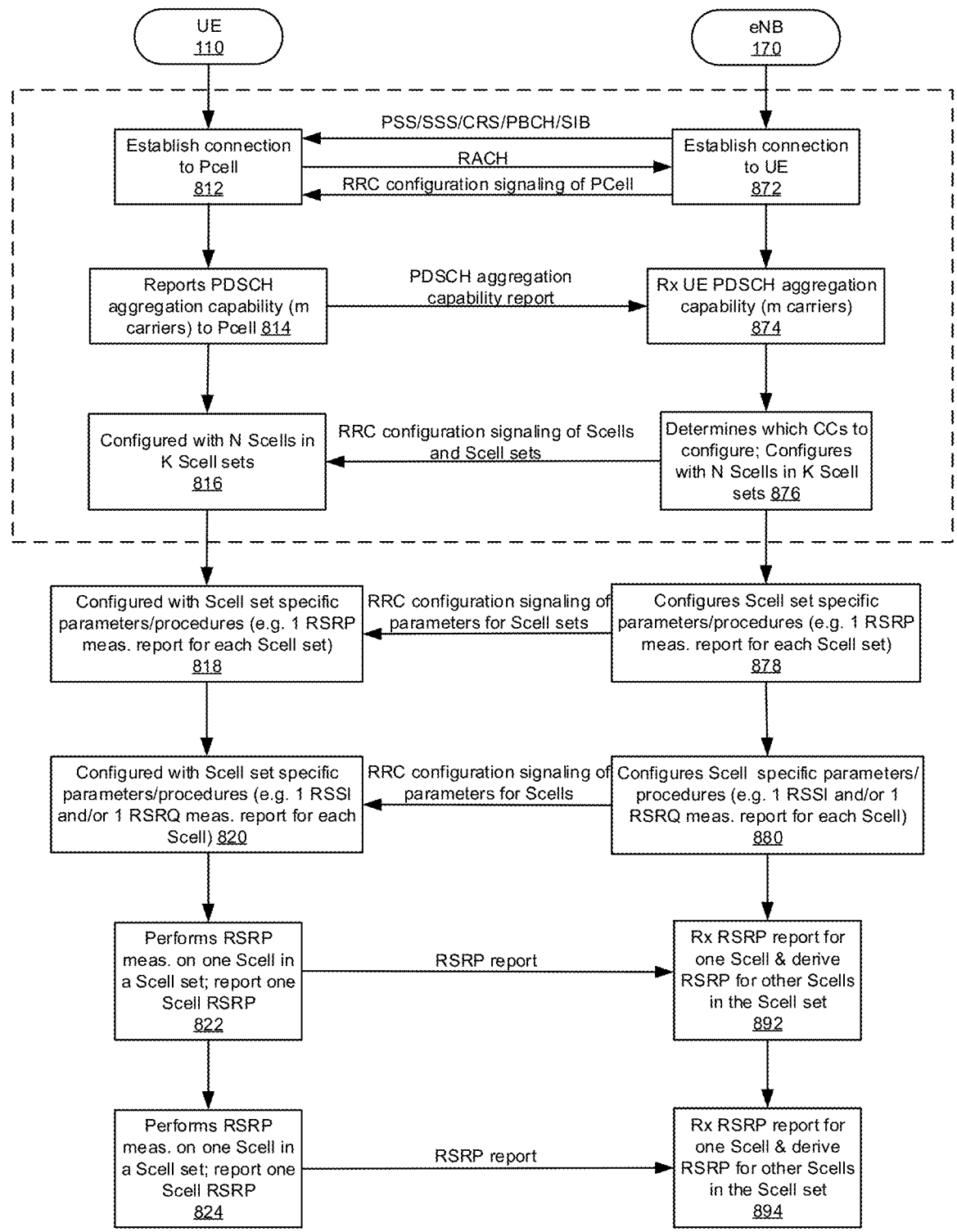
FIG. 8 illustrates another sequence diagram of configuring component carrier sets in accordance with FIGS. 3, 4, 5A and 5B.

FIG. 8 illustrates another sequence diagram of configuring component carrier sets in accordance with FIGS. 3, 4, 5A and 5B. More specifically, FIG. 8 illustrates another embodiment of configuring CC sets 402, 404, 406 similar to FIGS. 6 and 7. In the example embodiment, the establishment of a connection at 812 and 872, reporting of CA capability at 814 and 874 and initial configuration of N Scells in K Scell sets at 816 and 876 between UE 110 and base station 170 is the same as described in FIGS. 6 and 7.

At 878, the base station 170 configures the CC (Scell) set specific parameters and/or operations (e.g., the common set of parameters and/or operations). For example, in this embodiment, the base station 170 configures the CC set specific parameters and/or operations using a single RSRP measurement report for each CC set 402, 404, 406. The base station 170 then sends an RRC configuration signaling of the parameters and/or operations for the CC sets 402, 404, 406 to configure the RSRP measurements for each CC set 402, 404, 406 to the UE 110. The UE 110 is then configured with the RSRP measurement configurations for each CC in the CC set 402, 404, 406 at 818.

At 880, the base station 170 configures the CC (Scell) set specific parameters and/or operations (e.g., the common set of parameters and/or operations). For example, in this embodiment, the base station 170 configures the CC set specific parameters and/or operations using a single received signal strength indicator (RSSI) and/or reference signal received quality (RSRQ) measurement report for each CC set 402, 404, 406. The base station 170 then sends an RRC configuration signaling of the parameters and/or operations for the CC sets 402, 404, 406 to configure the RSRP measurements for each CC set 402, 404, 406 to the UE 110. The UE 110 is then configured with the RSSI and/or RSRQ measurement configurations for each CC in the CC set 402, 404, 406 at 820. It is appreciated that a single RRC configuration signaling of the parameters and/or operations may be used, as opposed to multiple RRC configuration signaling.

At 822, the UE 110 performs an RSRP measurement on one CC of a CC set 402, 404, 406, and sends the RSRP measurement report to the base station 170. Upon receipt of the RSRP measurement report from the UE 110, the base station 170 calculates the RSRP for each of the other CCs in the respective CC set 402, 404, 406 at 892. At 824, the UE 110 performs another RSRP measurement on one CC of a CC set 402, 404, 406, and sends the RSRP measurement report to the base station 170. Upon receipt of the RSRP measurement report from the UE 110, the base station 170 calculates the RSRP for each of the other CCs in the respective CC set 402, 404, 406 at 894.

The embodiments described above with respect to FIGS. 6-8 are non-limiting. Any number of different measurements, calculations, signaling, etc. may be implemented on the system such that the base station may configure the UE using CC sets and a common set of parameters and/or operations.

Measurement of configured CCs, as performed in the various embodiments discussed above, is described in the discussion that follows. For a UE 110 configured with more carriers than it can receive PDSCH simultaneously, there are several embodiments that may be implemented to conduct radio resource management (RRM) measurements, depending on the UE 110 capability. The RRM measurements may include, but are not limited to, for example channel quality indicator (CQI), RSRP, RSRQ, and RSSI. It is appreciated that the embodiments disclosed below are non-limiting.

In a first embodiment, the UE 110 performs RRM measurements on all configured CCs without using gaps. If the UE 110 is configured with N CCs, the UE 110 should be able to perform RRM measurements on all N CCs without any interruptions. The UE 110 may implement such a procedure according to one of the following: 1) The UE 110 can receive a PDSCH from all configured CCs simultaneously. UEs 110 receiving a PDSCH for all configured CCs simultaneously are CA-capable, and may therefore perform RRM measurements on all configured CCs without any gaps. Low-category CA-capable UEs 110 also fall into this category; and 2) If the UE 110 cannot receive a PDSCH from all configured CCs simultaneously (even if per-CC data rate is kept low), the UE 110 may access more carriers via a carrier CS-based approach. However, the UEs 110 may still be capable of performing RRM measurements on all configured CCs without using gaps.

For example, if a UE 110 is capable of receiving 6 CCs simultaneously and is configured with 10 CCs, the UE 110 may be configured to receive a PDSCH from at most 5 CCs at the same time, leaving extra capabilities to monitor any other CC. Since performing the RRM measurements of a CC does not require continuous monitoring of the CC, the extra capabilities may be used by the UE 110 to cycle through all other CCs for RRM measurements.

The time scale for the UE 110 to cycle through those CCs may generally be in terms of several sub-frames or longer, if the UE 110 needs to perform synchronization based on primary synchronization signal (PSS)/secondary synchronization signal (SSS)/cell specific reference signal (CRS) and measurements of RSRP/RSSI based on CRS and other REs. However, it may be significantly shorter if the synchronization/measurements are based on preambles or new RS designs (especially in (LAA)-LTE). In the latter case, the UE 110 may cycle through the CCs within one sub-frame, and the CCs may correspondingly transmit the preambles/RS for the UE 110 to perform synchronization and measurements. In an alternative embodiment, a UE 110 may be capable of wideband receiving on a band in addition to a PDSCH receiving capability on a subset of CCs of the band, such that the UE 110 can perform RRM measurements on all CCs of the band.

Accordingly, it can be seen that the RF requirements for supporting RRM measurements on n CCs can be lower than RF requirements for supporting simultaneous PDSCH receiving on n CCs. Thus, UEs operating according to this option should have the RF capability of supporting RRM measurements, but not necessarily the RF capability of receiving from all configured CCs simultaneously.

In a second embodiment, UE 110 performs RRM measurements on some of the configured CCs using gaps. UEs 110 of this type are not capable of receiving a PDSCH from all configured CCs simultaneously. Therefore, the UE 110 may access more carriers via the CS-based approach but not the CA-based approach. However, the UEs 110 may still be capable of performing RRM measurements on all configured CCs, provided that measurement gaps are used.

For example, if the UE 110 is configured with 10 CCs but has a limited capability of receiving 5 CCs at the same time, measurement gaps may be used for RRM measurement for some of the CCs. Existing measurement gaps could be reused for these measurements, and further enhancements, such as configured measurement gaps specifically for Scells, may also be considered. For example, the UE 110 may be receiving from 5 CCs out of the configured 10 CCs. However, for every x sub-frames, the UE 110 interrupts on the 5 receiving CCs and switches to the other 5 CCs for RRM measurements, e.g., for several sub-frames. In one embodiment, two or more sets of gaps may be configured, with different periodicities, starting points, durations, priorities (for dropping in case of collision), and one may be used for neighbor cell inter-frequency measurements, while another may be used for CCs. Alternatively, aperiodic measurement gaps, or trigger-based measurement gaps, may also be used.

In a third embodiment, the UE 110 and the network rely on alternative measurements for some configured CCs (particularly for LAA) In this case, UEs 110 are not capable of receiving a PDSCH from all configured CCs simultaneously. Therefore, they may access more carriers via the CS-based approach but not the CA-based approach. Additionally, as explained above, direct measurements on all configured CCs may not be needed. That is, as explained above, measurements on a subset of CCs may be sufficient to measure all of the CCs.

For example, if the UE 110 is configured with 10 CCs and may receive at most 5 CCs at the same time, the network may not configure the UE 110 to report RRM measurements for some of the CCs. However, the network may rely on RSRP measurements for other CCs within the same band since the RSRP on one CC can be derived from the RSRP on an intra-band CC, as explained above in detail. In the case of LAA, RSRQ is not available for the CCs. However, the network generally has reasonable estimates of the interference for the CCs through sensing to make an effective measurement.

It is also appreciated that these various embodiments may be combined in to work together or operate in an independent manner.

In another example, for LAA CCs in the unlicensed band sharing the same set of antennas, the base station 170 and UE 110 may assume that CRS from different CCs are QCL. Therefore, the RSRP obtained on one CC can be used for an RSRP on another CC in the same band. By proper configuration, the RSRP bias introduced by this QCL method should be relatively small.

For example, for a 5 GHz spectrum, the pathloss difference between 5.15 GHz and 5.85 GHz is at most $20*\log 10 (5.85/5.15)=1.1$ dB. Frequency measurements within the band (and not at the extreme edges of the bands) or if additional bands are introduced to the 5 GHz spectrum, the difference should become even smaller. For instance, it may be useful to use a CC near the center frequency of the band for the reference RSRP or to eliminate the bias by compensation.

In the latter case, the UE 110 is aware of the carrier frequency of each CC, and when computing the RSRP on a CC, the following considerations may be applied: for CC1, the UE 110 measures the RSRP1 with the carrier frequency F1; and for CC2 with the carrier frequency F2, the UE 110 calculates the RSRP2=RSRP1+$20*\log 10$ (F1/F2). If transmission power difference among the different CCs exist, additional (and similar) compensation can be performed. In this case, the base station 170 may signal the UE 110 with the transmission powers of the CCs or the power differences across the CCs and/or over time.

Implementing the methodology used in the examples above, the UE 110 can perform RSRP measurements for each of the CCs over the entire band based on the RS (e.g., CRS, dedicated reference signal (DRS)) on any of the CCs. The UE110 may switch carriers from time to time. However, the UE 110 can use the RS on the switched CCs to derive the RSRP on each of the CCs.

To support LAA, especially due to the limitation of the maximum channel continuous occupancy time for discontinuous transmission, fast carrier switching should support the UE 110 to switch to any carrier within a set of carriers selected by the serving base station 170 as fast as the subframe/symbol-level. More specifically, the base station 170 may send an indicator to the UE 110 to switch to the indicated carriers and to monitor the carriers. The UE 110 may then perform switching and start monitoring the indicated carriers and stop monitoring other carriers. The base station 170 indicator should be fast, for example, taking the UE 110 only a few OFDM symbol durations (or at most a subframe) to complete the detection and decoding.

Several indicators for fast carrier switching, fast on/off and LBT-based discontinuous transmissions/receptions may be implemented as follows: (1) indicator for fast carrier switching: L1 indicator or enhanced SCell activation/deactivation signaling; (2) indicator for fast carrier on/off: Fast carrier on/off may be viewed as a special case of fast carrier switching; and (3) Indicators for LBT-based discontinuous transmissions/receptions: Sufficiently fast given the potentially very limited duration of a transmit opportunity (TXOP) (as short as about 4 milliseconds). Therefore, this is closely related to the indicator for fast on/off.

In an example of fast carrier switching using an L1 indicator, we consider the case where the UE 110 supports up to 5 carriers for simultaneous PDSCH reception and is configured with 8 CCs. In one embodiment, and based on a L1 indication for starting/stopping monitoring of up to 5 activated carriers, the UE is configured with 8 CCs, with at most 5 CCs activated via MAC signaling of SCell activation/deactivation. Then based on LBT progress over the CCs, an L1 indicator is sent from the network to inform the UE 110 which of the 5 CCs should be monitored. The UE 110 may then receive data burst(s) on the monitored CCs. Another L1 indicator may be sent after the bursts to alter the CCs to be monitored. The L1 indicator may be explicit (i.e., based on a signaling) or implicit (i.e., based on self-scheduling and UE detection of scheduling information on the SCell).

In another embodiment, and based on an L1 signaling for starting/stopping monitoring of up to 8 activated carriers, fast carrier switching is performed on more than 5 CCs (i.e., there can be more CCs activated for the UE than its PDSCH aggregation capability). The UE 110 is configured with 8 CCs, with up to 8 CCs that are activated via MAC signaling of SCell activation/deactivation. The UE 110 monitors at most 5 CCs according an L1 indicator, where the L1 indicator is explicit rather than implicit (an implicit indicator would require a UE 110 to monitor all activated carriers at the same time, exceeding the UE's capability).

In still another example, and based on an L1 signaling for activation/deactivation of the 8 configured carriers, the UE 110 is configured with 8 CCs, with at most 5 CCs activated via an L1 signaling of SCell activation/deactivation. For instance, based on an LBT progress over the CCs, an L1 signaling is sent by the network to inform which of the 8 CCs should be activated. The UE 110 may receive data burst(s) on the activated CCs. Subsequently, another L1 signaling may be sent after the bursts to alter the activated CCs.

In LAA, as there is a defined maximum channel occupancy duration, a UE 110 having received transmissions from a CC lasting the maximum channel occupancy duration can assume the base station 170 will need to release the channel for at least the minimum channel idle duration, and the UE 110 can stop/pause monitoring on the CC for the minimum channel idle duration. Subsequently, the UE 110 may resume monitoring.

Carrier aggregation of up to 32 CCs for different types of carriers in CA is also supported. One example considers supporting a carrier type for licensed CCs and another example considers carrier types for LAA CCs. It is appreciated that carrier types may not be limited to LAA and non-LAA carrier type. For example, there may be multiple carrier types. New carrier types, if introduced, can be handled in a similar way. For example, some carriers may have shorter TTIs, different subcarrier spacings, different sampling rates, different RS designs, etc.

Operationally, procedures on LAA and non-LAA CCs are different, such that the UE 110 should have knowledge of whether a CC is LAA or non-LAA. For example, the DRS on a non-LAA CC is guaranteed to be transmitted at particular locations in time, such that the locations are signaled to the UE 110. From the UE 110 perspective, the DRS is presumed to be at the signaled locations. Thus, if the DRS is not detected at the locations, the UE's RSRP measurement behavior may be impacted, such as updating the current RSRP with an invalid measurement value. In contrast, the DRS on an LAA CC cannot be guaranteed to be transmitted in particular locations in time. Rather, the DRS may be missing from the signaled locations or the DRS may be transmitted at non-predetermined locations. Thus, if the DRS is not detected at one location, the UE 110 may look for the DRS at the next possible location. In this case, the UE 110 does not update the RSRP until the DRS is detected.

In another example, the DRS on a non-LAA CC does not ensure that the DRS transmissions are contiguous in time. That is, there may be some OFDM symbols where no physical signal is transmitted if there are no data transmissions in the subframes carrying the DRS. LAA DRS should ensure that transmission bursts containing DRS signals consist of contiguous OFDM symbols. In this case, some signals are transmitted such that the signals may carry information for the UE 110 to detect.

Several example embodiments exist for the indicator of carrier types: (1) an explicit indicator by association to the band according to current standards. For example, in the unlicensed band, the UE 110 shall apply a set of behavior different from a set of behavior associated with other bands (e.g., licensed bands). That is, the UE 110 shall be able to derive the carrier type based on the band where the carrier is located. The sets of behavior may be defined such that if the CC is associated with carrier type 1, then the first set of the behavior shall be used, and if the CC is associated with carrier type 2, then the second set of the behavior shall be use; (2) an explicit indicator by configuration signaling. For example, the indicator may be signaling a UE 110 the type of CCs. When a CC is configured, there may be a field or UE 110 indicating that this CC is of carrier type 1 or carrier type 2. In another example, a configuration signaling may be defined, which configures the carrier types for all of the CCs or all of the carriers that the UE 110 may monitor (including inter-frequency neighboring cells); and (3) implicit indication by configuration signaling. For example, the indicator may be implicit, such as if it is indicated that additional signals are transmitted in a DRS-carrying subframe, or there is a timing window for the UE 110 to receive the DRS. In this case, the associated CC is assumed to be an LAA CC, otherwise the CC is assumed to be a non-LAA CC.

In another example, in embodiment (3), a UE 110 may be configured to a measurement object associated with a frequency. In this case, the measurement object specifies that at the frequency, the DRS transmission location is not guaranteed at a fixed location. The UE 110 may assume the associated carrier is an LAA carrier. Other LAA carrier type specific operations may also be required to be applied by the UE 110. Alternatively, if there are multiple carrier types with a non-fixed DRS location, the UE 110 may not be able to determine the exact carrier type and more information is required from other type-specific configurations.

In another embodiment, for any of the above-examples, since there may be a number of type-specific operations for each type, if the UE 110 receives information about one type-specific operation, it shall apply other operations specific to this type to the CC.

In another embodiment, the above examples may be for CCs configured to a UE 110, and may be for carriers/cells/virtual cells not configured to a UE 110, such as a neighboring cell for which the UE 110 may perform RRM measurements.

It should be noted that a carrier operating with fast on/off in the licensed spectrum may be similar to an unlicensed carrier, or use some techniques developed in LAA.

Moreover, the described embodiments may also be combined.

The embodiments above primarily relate to CS applied for DL. However, CS can also be applied for UL such that the UE 110 can utilize more UL carriers over time. Similar to the DL case, reducing the transition times for switching is beneficial. The benefits of CS and reducing the associated transition times for UL may be more pronounced than those for the DL, since it is not uncommon that a UE 110 can transmit on only one or a very small number of UL carriers at the same time.

The UE 110 may maintain the connections with all configured UL carriers, which can be more than the number of carriers the UE 110 can transmit simultaneously. For each of the connections, the UE 110 receives UL-related RRC configurations (e.g., UL carrier bandwidth, carrier frequency, power control/RACH/SRS configurations, etc.), and maintains the timing advance, pathloss, etc., to facilitate CS.

In one embodiment, if a UE 110 is configured with 10 CCs (and has a simultaneous Rx capability of only 5 CCs), then the soft buffer and #HARQ processes should be computed based on 5 configured serving cells, rather than on "N_cell_DL" number of configured serving cells. Therefore, in this case, the UE 110 reports the number of CCs on which it can receive a PDSCH simultaneously, and divides its soft buffer based on this number. Accordingly, at the base station 170, it assumes that the UE 110 divides its soft buffer based on the number of CCs on which it can receive s PDSCH simultaneously, not based on the number of CCs the base station 170 may configure to the UE 110.

In another embodiment, a UE 110 may report its capabilities regarding simultaneous PDSCH receive capability, RRM measurement capability without gaps, RRM measurement capability with gaps.

In yet another embodiment, a CC set 402, 404, 406 is employed (as described above). In one example, the CCs on the LAA band can form one CC set 406, and CCs on licensed bands can form other CC sets 402, 402 (FIG. 4). Information about a particular CC set 402, 404, 406 may be signaled to the UE 110 from a base station 170. Such information may include, but is not limited to: a) RSRP measurements in the same CC set 402, 404, 406 are the same for each CC. Within each CC set 402, 404, 406, whether the UE 110 requires gap for RRM measurements is reported to the base station 170; b) Synchronization to the CCs within the same CC set 402, 404, 406 may be the same; c) The CCs within the same CC set 402, 404, 406 can be QCL with respect to some channel characteristics, such as pathloss, AoA, AoD, etc.; d) The CCs within the same CC set 402, 404, 406 have the same DL-UL configuration, in the case of enhanced interference mitigation and traffic adaptation (eIMTA); e) The CCs within the same CC set 402, 404, 406 may share the same modulation and coding scheme (MCS), and/or the same precoding matrix indicator/rand indicator (PMI/RI), which can save (E)PDCCH signaling overhead when scheduling resources on any CCs within the same CC set 402, 404, 406; and f) The CCs within the same CC set 402, 404, 406 may be associated with the same UL timing advance (i.e., belonging to the same TAG), and UL power control for any CC with the same CC set 402, 404, 406 follows the same procedure and parameters.

In still another embodiment, proper scheduling and/or Scell activation/deactivation can help eliminate the interruptions needed for RRM measurements on a large number of Scells. For example, after deactivation of a Scell, the UE 110 may switch to another Scell for RRM measurements without causing an interruption. That is, as long as the network does not exhaust the UE's RF capability of simultaneous PDSCH Rx, the UE 110 should be able to perform RRM measurements using the extra RF capability.

In another embodiment, to support fast CS, the following scheduling related options may be employed: a) Use cross-carrier DCI to indicate to a UE 110 that the UE 100 needs to monitor a CC. In this case, the first several OFDM symbols of the first sub-frame may not carry any information for the UE 110 on that CC. This allows the UE 110 to have ample time for switching. Thus, data transmission may start from the next sub-frame(s) (which may rely on self-scheduling based on (E)PDCCH on the CC). Data transmission may also start from the first sub-frame based on cross-carrier scheduling, such that the UE 110 starts to buffer according to the starting OFDM symbol position indicated in the scheduling DCI. However, in this case, the starting OFDM symbol are restricted for the starting OFDM symbols according to the position of DCI and the latency associated with UE 110 detecting the DCI; b) Use self-scheduling on the CC, in which the UE 110 monitors and buffers for the CC. Such CCs with self-scheduling enabled should be included in a CC set 402, 404, 406, where each CC in the CC set 402, 404, 406 should be monitored by the UE 110. A CC may be added into the CC set 402, 404, 406 by a DCI indicator. A CC may also be associated with a particular starting position, where the UE 110 switches to that CC to monitor the starting position for that CC, and detects if there is any grant for the UE 110. The starting positions for different CCs may also be interlaced; and c) In LAA-LTE, once the base station 170 finds the channel is clear and uses a reservation signal to occupy the channel, any UE 110 associated with the base station 110 may be scheduled on the channel.

Figure 9A:
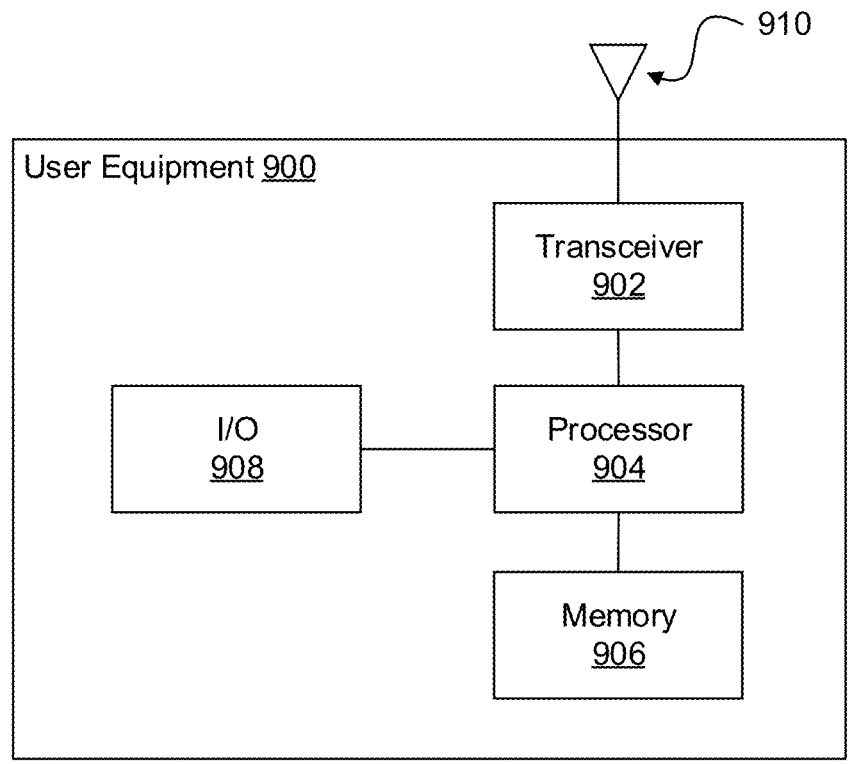
FIG. 9A illustrates example user equipment that may implement the methods and teachings according to this disclosure.

FIG. 9A illustrates example user equipment that may implement the methods and teachings according to this disclosure. As shown in the figure, the UE 900 includes at least one processor 904. The processor 904 implements various processing operations of the UE 900. For example, the processor 904 may perform signal coding, data processing, power control, input/output processing, or any other functionality enabling the UE 900 to operate in the system 100 (FIG. 1). The processor 900 may include any suitable processing or computing device configured to perform one or more operations. For example, the processor 900 may include a microprocessor, microcontroller, digital signal processor, field programmable gate array, or application specific integrated circuit.

The UE 900 also includes at least one transceiver 902. The transceiver 902 is configured to modulate data or other content for transmission by at least one antenna 910. The transceiver 902 is also configured to demodulate data or other content received by the at least one antenna 910. Each transceiver 902 may include any suitable structure for generating signals for wireless transmission and/or processing signals received wirelessly. Each antenna 910 includes any suitable structure for transmitting and/or receiving wireless signals. It is appreciated that one or multiple transceivers 902 could be used in the UE 900, and one or multiple antennas 910 could be used in the UE 900. Although shown as a single functional unit, a transceiver 902 may also be implemented using at least one transmitter and at least one separate receiver.

The UE 900 further includes one or more input/output devices 908. The input/output devices 908 facilitate interaction with a user. Each input/output device 908 includes any suitable structure for providing information to or receiving information from a user, such as a speaker, microphone, keypad, keyboard, display, or touch screen.

In addition, the UE 900 includes at least one memory 906. The memory 906 stores instructions and data used, generated, or collected by the UE 900. For example, the memory 906 could store software or firmware instructions executed by the processor(s) 904 and data used to reduce or eliminate interference in incoming signals. Each memory 906 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 9B:
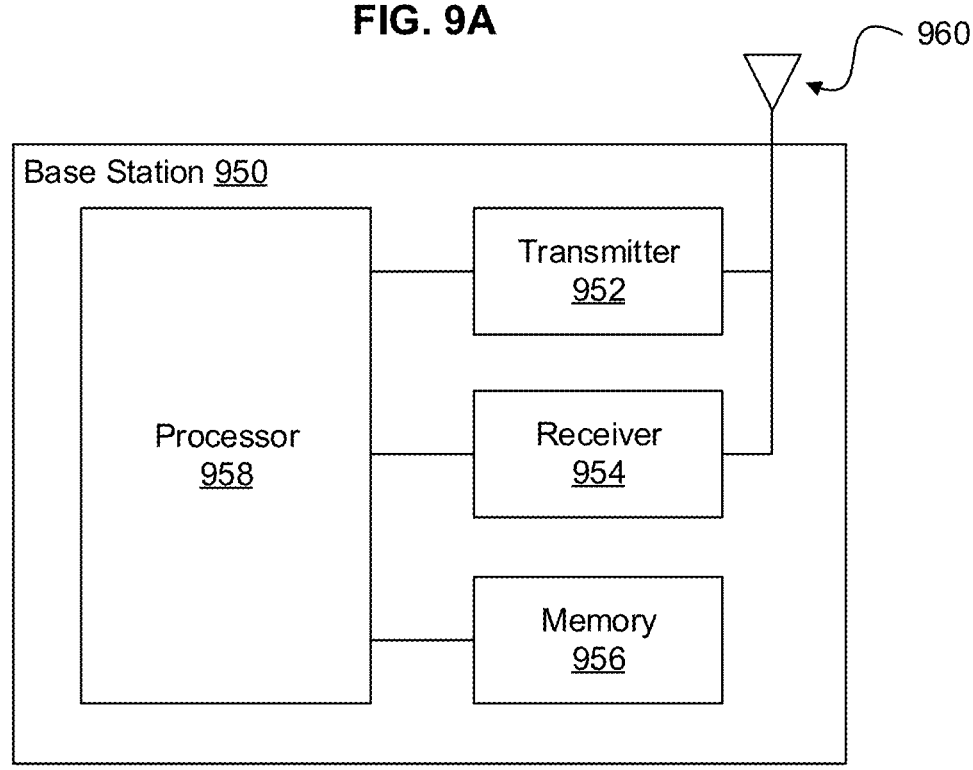
FIG. 9B illustrates example base station that may implement the methods and teachings according to this disclosure.

FIG. 9B illustrates example base station that may implement the methods and teachings according to this disclosure. As shown in the figure, the base station 950 includes at least one processor 958, at least one transmitter 952, at least one receiver 954, one or more antennas 960, and at least one memory 956. The processor 958 implements various processing operations of the base station 950, such as signal coding, data processing, power control, input/output processing, or any other functionality. Each processor 958 includes any suitable processing or computing device configured to perform one or more operations. Each processor 958 could, for example, include a microprocessor, microcontroller, digital signal processor, field programmable gate array, or application specific integrated circuit.

Each transmitter 952 includes any suitable structure for generating signals for wireless transmission to one or more UEs or other devices. Each receiver 954 includes any suitable structure for processing signals received wirelessly from one or more UEs or other devices. Although shown as separate components, at least one transmitter 952 and at least one receiver 954 could be combined into a transceiver. Each antenna 960 includes any suitable structure for transmitting and/or receiving wireless signals. While a common antenna 960 is shown here as being coupled to both the transmitter 952 and the receiver 954, one or more antennas 960 could be coupled to the transmitter(s) 952, and one or more separate antennas 960 could be coupled to the receiver(s) 954. Each memory 956 includes any suitable volatile and/or non-volatile storage and retrieval device(s).

Figure 10:
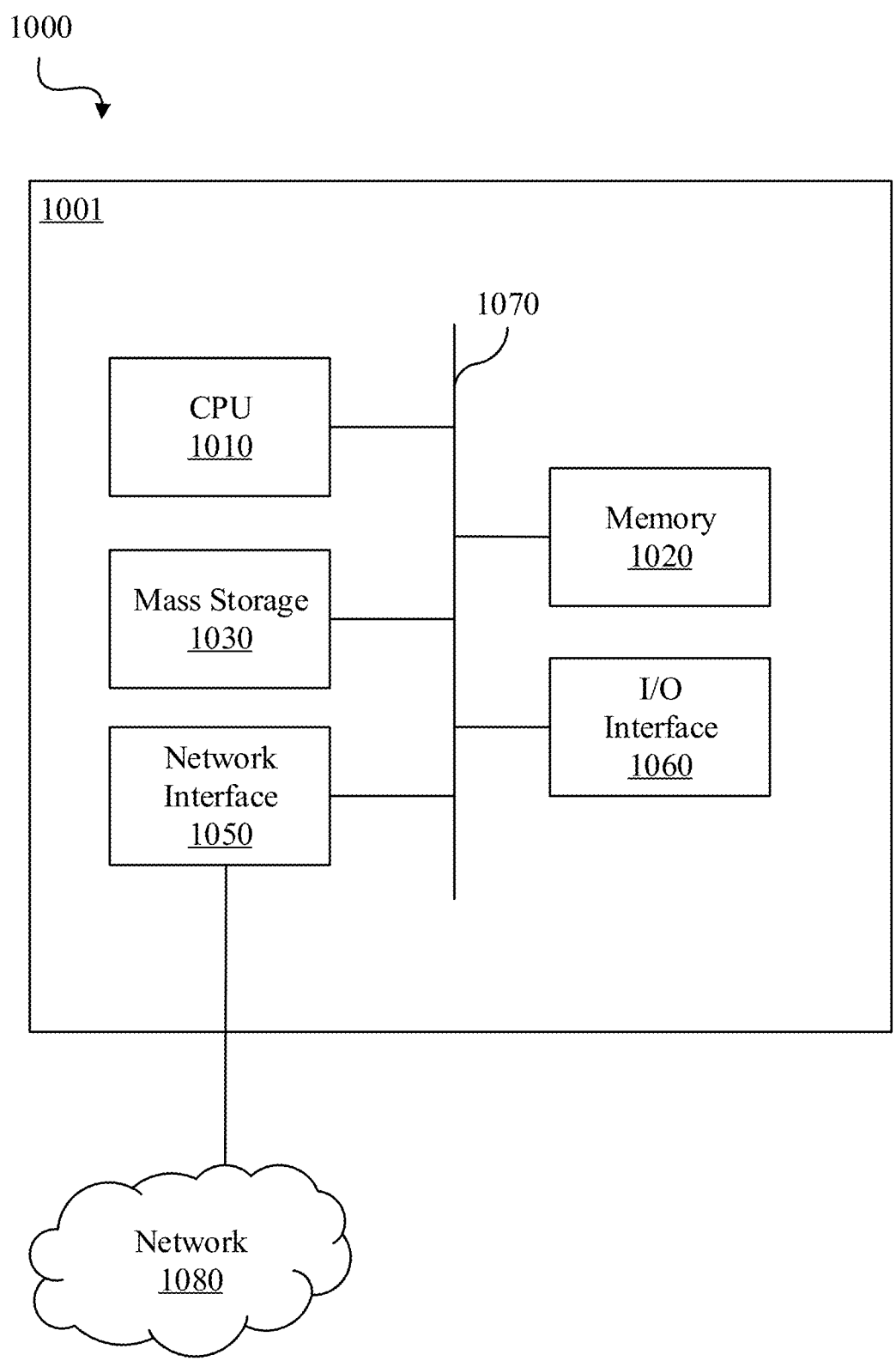
FIG. 10 illustrates a block diagram of a network system that can be used to implement various embodiments.

FIG. 10 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 1001 equipped with one or more input/output devices, such as network interfaces, storage interfaces, and the like. The processing unit 901 may include a central processing unit (CPU) 1010, a memory 1020, a mass storage device 1030, and an I/O interface 1060 connected to a bus. The bus may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The processing unit 1001 also includes one or more network interfaces 950, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Various embodiments may exists to configure CC sets, where each set is configured with set-specific configurations/parameters applicable to all CCs in the set. For example, the following non-limiting embodiments may be employed for configuring CC sets: RSRP measurement and reporting configurations where only one CC needs to be configured, the UE does not have to wait for configurations for other CCs, only one set of RACH configuration/parameters is required, TAG configuration for the set may be accomplished with only one CC being configured, only a single SCell needs to be configured for power control parameters, only a single SCell needs to be configured for static DL-UL configuration, only a single SCell needs to be configured for TDD configuration, only a single SCell needs to be configured for dynamic DL-UL reconfiguration, only a single SCell needs to be configured for common DMTC, only a single SCell needs to be configured for measurement gap configuration, and the SCells in a set may be configured as QCL with respect to delay spread, doppler spread, doppler shift, average gain, and average delay. The notion of "set" may be implicit (via QCL or a reference CC, etc.; assign a set ID to a CC; assign a reference CC to a CC; add/remove a CC in a set; configure a port (CRS/PSS/SSS/DRS/CSI-RS) of CC1 as QCL with a port of CC2, etc.).

With respect to the UE and base station behavior, the UE does not expect to receive parameters for some CCs, but applies intra-set settings for those CCs; derives timing/frequency synchronization of all SCells in a set based on one Scell, derives pathloss of an unmeasured SCell based on intra-set PL (with an offset if needed), only need to RACH to one SCell in a set and derives DL-UL configuration, special sub-frame configuration, etc., of a set based on indication of one SCell in the set. The base station determines the sets based on bands (intra-band CCs as a set; different sets for licensed/unlicensed CCs; etc.), may derive RSRP of an unreported SCell based on intra-set RSRP report (with an offset if needed), and derives DL precoding on a TDD CC based on SRS on another TDD CC (one way to solve the critical TDD MIMO issue with CA).

There are many benefits to using embodiments of the present disclosure. For example, the disclosed technology enables a UE (possibly with limited CA capability) to maintain connections to many carriers with much reduced overhead in signaling/operations, supports fast carrier switching with significant performance improvements, supports massive CA in an efficient manner; enables efficient LAA, performance benefits for fast carrier switching of ~2× for mean user packet throughput (UPT) and ~5× for edge UPT, allows a massive amount of spectrum resources for future use, and allows configuration via signaling to be detectable in the air interface.

It is also appreciated that the embodiments of the disclosure apply to both semi-static and dynamic carrier switching, and focuses on the support of carrier selection/switching in LAA, although is also applicable to general systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for a user equipment, comprising:
the user equipment receiving a first configuration signaling from a base station to configure a plurality of component carriers, the plurality of component carriers corresponding to one or more component carrier groups;
the user equipment performing a time and frequency synchronization with a first component carrier in the plurality of component carriers within a first component carrier group of the one or more component carrier groups; and the user equipment determining a time and frequency synchronization with a second component carrier within the first component carrier group based on the time and frequency synchronization performed with the first component carrier.

2. The method of claim 1, further comprising:
receiving a second configuration signaling from the base station to configure each of the component carrier groups with a common set of parameters and operations.

3. The method of claim 1, wherein the first configuration signaling comprises a component carrier set indicator for each of the component carriers.

4. The method of claim 1, wherein the first configuration signaling comprises a set of component carrier indicators for each of the component carriers.

5. The method of claim 1, wherein configuring the plurality of component carriers is based at least in part on a determination made by the base station in view of the user equipment carrier aggregation capability.

6. The method of claim 1, further comprising:
receiving, from the base station, a third configuration signaling to configure one component carrier in the plurality of component carriers, such that remaining component carriers in the one or more component carrier groups are configured based on the third configuration signaling.

7. The method of claim 1, further comprising:
establishing a connection to the base station;
receiving the configuration signaling from the base station to assign a primary cell;
sending a carrier aggregation capability for configuring one or more of the plurality of component carriers; and
receiving the configuration signaling from the base station to assign secondary cells.

8. A device, comprising:
a non-transitory memory storage comprising instructions; and
one or more processors in communication with the memory, wherein the one or more processors execute the instructions to:
receive a first configuration signaling to configure a plurality of component carriers, the plurality of component carriers corresponding to one or more component carrier groups;
perform a time and frequency synchronization with a first component carrier in the plurality of component carriers within a first component carrier group of the one or more component carrier groups; and
determine a time and frequency synchronization with a second component carrier within the first component carrier group based on the time and frequency synchronization performed with the first component carrier.

9. The device of claim 8, wherein the one or more processors further execute the instructions to receive a second configuration signaling to configure each of the component carrier groups with a common set of parameters and operations.

10. The device of claim 8, wherein the first configuration signaling comprises a component carrier set indicator for each of the component carriers.

11. The device of claim 8, wherein the first configuration signaling comprises a set of component carrier indicators for each of the component carriers.

12. The device of claim 8, wherein configuring the plurality of component carriers is based at least in part on a determination in view of the user equipment carrier aggregation capability.

13. The device of claim 8, wherein the one or more processors further execute the instructions to receive a third configuration signaling to configure one component carrier in the plurality of component carriers, such that remaining component carriers in the one or more component carrier groups are configured based on the third configuration signaling.

14. The device of claim 8, wherein the one or more processors further execute the instructions to:
establish a connection to a base station;
receive the configuration signaling from the base station to assign a primary cell;
send a carrier aggregation capability for configuring one or more of the plurality of component carriers; and
receive the configuration signaling from the base station to assign secondary cells.

15. A non-transitory computer-readable medium storing computer instructions, that when executed by one or more processors, cause the one or more processors to perform the steps of:
receiving a first configuration signaling to configure a plurality of component carriers, the plurality of component carriers corresponding to one or more component carrier groups;
performing a time and frequency synchronization with a first component carrier in the plurality of component carriers within a first component carrier group of the one or more component carrier groups; and
determining a time and frequency synchronization with a second component carrier within the first component carrier group based on the time and frequency synchronization performed with the first component carrier.

16. The non-transitory computer-readable medium of claim 15, further causing the one or more processors to perform the step of receiving a second configuration signaling to configure each of the component carrier groups with a common set of parameters and operations.

17. The non-transitory computer-readable medium of claim 15, wherein the first configuration signaling comprises a component carrier set indicator for each of the component carriers.

18. The non-transitory computer-readable medium of claim 15, wherein the first configuration signaling comprises a set of component carrier indicators for each of the component carriers.

19. The non-transitory computer-readable medium of claim 15, wherein configuring the plurality of component carriers is based at least in part on a determination in view of the user equipment carrier aggregation capability.

20. The non-transitory computer-readable medium of claim 15, further causing the one or more processors to perform the step of receiving a third configuration signaling to configure one component carrier in the plurality of component carriers, such that remaining component carriers in the one or more component carrier groups are configured based on the third configuration signaling.

21. The non-transitory computer-readable medium of claim 15, further causing the one or more processors to perform the steps of:
establishing a connection to a base station;
receiving the configuration signaling from the base station to assign a primary cell;

sending a carrier aggregation capability for configuring one or more of the plurality of component carriers; and
receiving the configuration signaling from the base station to assign secondary cells.

* * * * *